United States Patent [19]

Daniel et al.

[11] 4,334,283

[45] Jun. 8, 1982

[54] ADAPTIVE FIXED POINT ARITHMETIC CONTROLLER APPARATUS AND METHOD

[75] Inventors: Sam M. Daniel, Tempe; Richard P. Kuivila, Phoenix, both of Ariz.

[73] Assignee: Motorola Inc., Schaumburg, Ill.

[21] Appl. No.: 159,036

[22] Filed: Jun. 13, 1980

[51] Int. Cl.³ .............................................. G06F 7/38
[52] U.S. Cl. .................................... 364/744; 364/900
[58] Field of Search ............... 364/744, 736, 715, 700, 364/200, 900

[56] References Cited

U.S. PATENT DOCUMENTS

| | | | |
|---|---|---|---|
| 3,575,590 | 4/1971 | Crowther et al. | 364/744 |
| 3,634,666 | 1/1972 | Ragen | 364/744 |
| 3,692,990 | 9/1972 | Kurokawa et al. | 364/744 |
| 3,916,388 | 10/1975 | Shimp et al. | 364/200 |

Primary Examiner—David H. Malzahn
Attorney, Agent, or Firm—Eugene A. Parsons

[57] ABSTRACT

Adaptive scaling circuitry connected to local scalars to accummulate digital shifts during calculations and associate the shifts with particular quantities involved. The circuitry also supplies shift commands to certain scalers so that calculations such as adding and subtracting can be performed. The shifting of digital words is performed so that optimum use of the number of bits in a word may be made. In complex computation systems the adaptive scaling takes the place of an AGC function throughout the computations.

10 Claims, 7 Drawing Figures

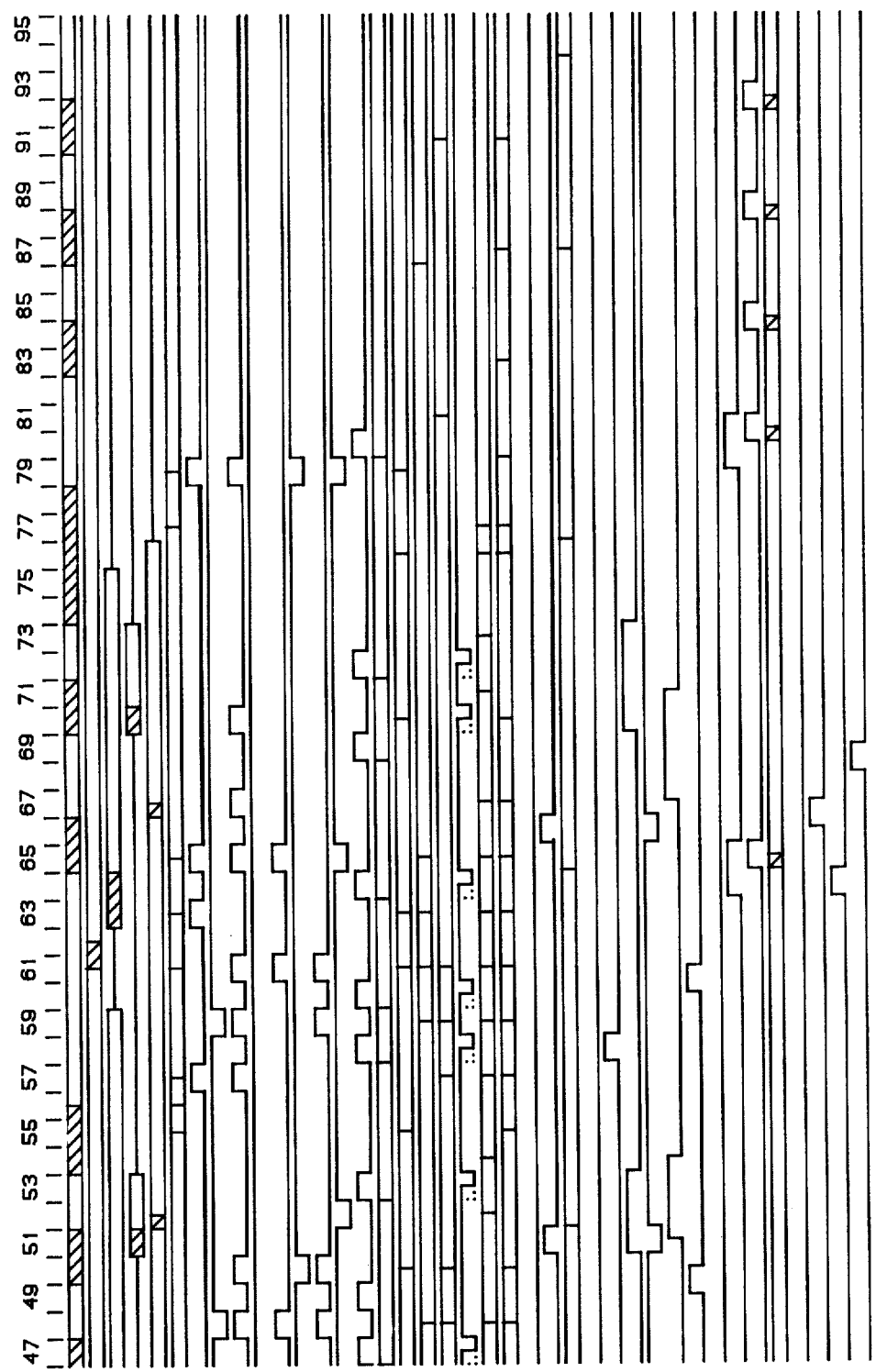

ADAPTIVE FIXED POINT ARITHMETIC CONTROLLER APPARATUS AND METHOD

BACKGROUND OF THE INVENTION

In many applications sophisticated electronics are utilized to automatically solve a complex system of linear equations involving a Hermitian matrix. Generally, real time quadratic optimization problems that arise in linear and nonlinear estimation lead to such a system of equations. Some specific examples of apparatus involving such problems include adaptive antenna array processing, speech processing, spectral estimation, CAT scanning, picture processing, trajectory estimation, etc. For purposes of this disclosure, adaptive antenna array processing systems, such as those disclosed in the copending application entitled "Adaptive Antenna Array Including Batch Covariance Relaxation Apparatus and Method" filed of even date, Ser. No. 159,027, are utilized but it should be understood that the disclosed apparatus and processes may be adapted to operate with any of the above described systems.

A complex system of linear equations involving a Hermitian matrix may be solved by means of the Batch Covariance Relaxation (BCR) approach described in the above identified copending patent application. The BCR processor utilizes adaptive scaling circuits constructed generally in accordance with the disclosure in the copending patent application entitled "Digital Scaling Apparatus", filed Mar. 28, 1980, Ser. No. 134,859, and assigned to the same assignee. The adaptive scaling takes the place of an AGC function throughout the computations involved, thereby quaranteeing maximum numerical resolution and minimum round-off error. The various shifts are monitored and accumulated by the present global scaling apparatus and the adaptive scaling circuits are controlled by the global scaling apparatus so that various mathematical operations can be performed.

SUMMARY OF THE INVENTION

The present invention pertains to an adaptive fixed point arithmetic controller for use with a digital processor including storage and combining means for maintaining a continuous account of bit shifts throughout the digital processor and providing an output signal representative of the total number of bit shifts present subsequent to the completion of a mathematical operation. Further the controller includes circuits for determining the completion of the mathematical operation.

The invention further pertains to circuitry for generating bit shifting commands for application to the digital processor so that functions such as addition and subtraction can be performed on various signals.

It is an object of the present invention to provide new and improved apparatus for providing global scaling in conjunction with local scaling circuitry.

It is a further object of the present invention to provide new and improved apparatus for providing a continuous count of bit shifts during a variety of mathematical operations and for providing control signals to local scaling circuits.

It is a further object of the present invention to provide global scaling apparatus including detection of stopping criteria in an associated BCR Processor.

These and other objects of this invention will become apparent to those skilled in the art upon reconsideration of the accompanying specification, claims and drawings.

BRIEF DESCRIPTION OF THE DRAWINGS

Referring to the drawings, wherein like characters indicate like parts throughout the Figures:

FIGS. 5A and 5B is a timing diagram for the scaling unit illustrated in FIG. 4.

DESCRIPTION OF THE PREFERRED EMBODIMENT

Figure 1:
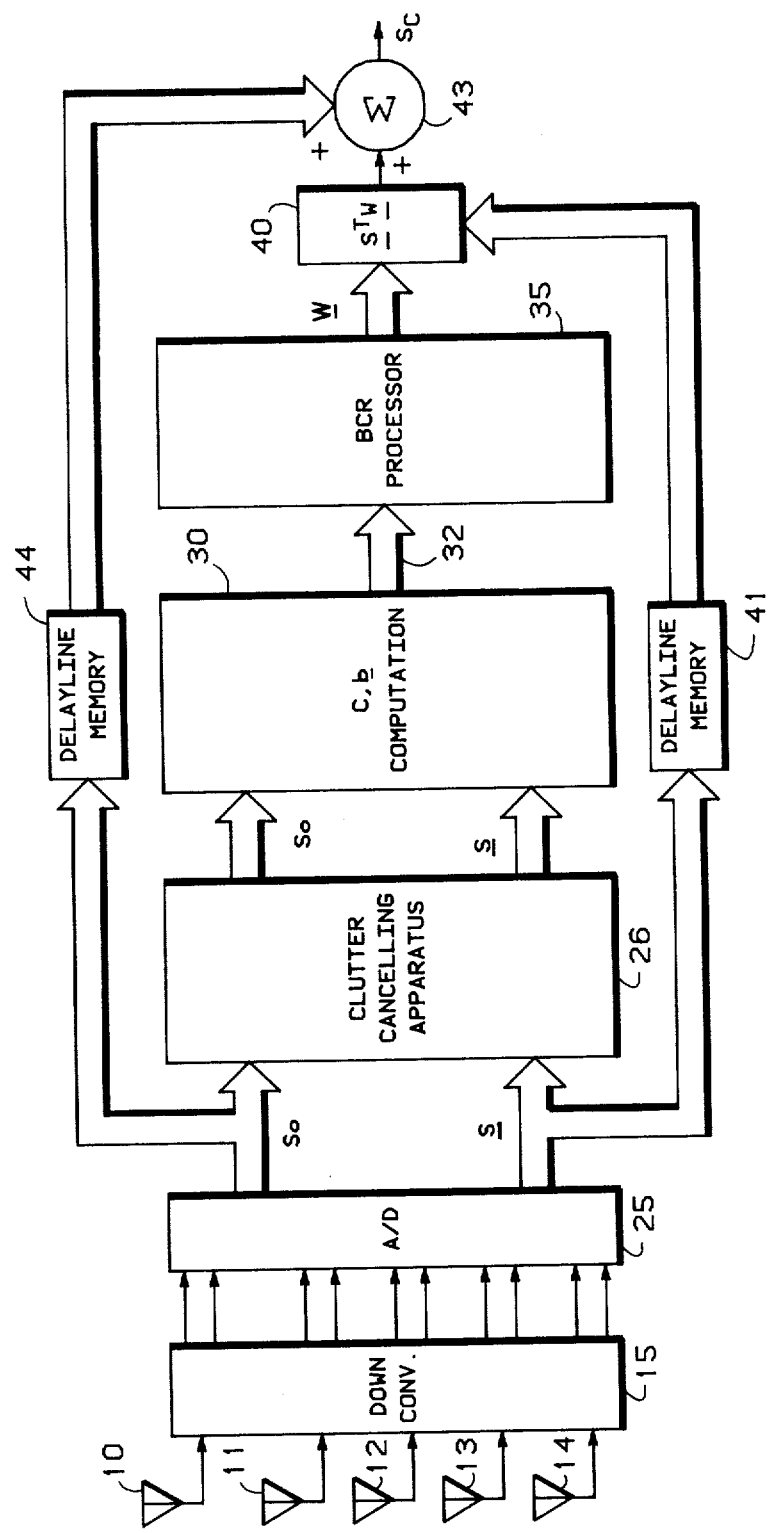
FIG. 1 is a block diagram of an adaptive antenna array and BCR Procesor embodying the present invention.

Referring specifically of FIG. 1, a main narrow beam, low-sidelobe directional antenna 10 and a plurality, N (which in the present embodiment is 4), of omnidirectional antennas 11, 12, 13 and 14 supply received signals to a down-converter 15. The down converter 15 is generally used to translate the operating frequency band at RF to a convenient frequency band at IF or even down to baseband as is the case in the present invention. Down-conversion is generally accomplished in a number of stages from RF through at least one IF and finally to baseband. At baseband down-conversion yields in-phase and quadrature outputs by appropriate mixing with a local oscillator at 0° and 90°. These resulting I and Q outputs constitute complex baseband signals from the main and auxiliary antennas. These signals are subsequently sampled (at the Nyquist rate or higher) by means of an analog-to-digital conversion unit 25, consisting of a bank of 2(N+1) individual A/D converters which represent the corresponding input signals in binary format by means of a plurality of bits (for example, 10). Note that down-converter 15 and A/D converter 25 are standard circuits well-known in the art and the construction thereof will not be elaborated upon herein.

The aim of the adaptive array processing apparatus of FIG. 1 is to compute adaptive auxiliary weights which when applied to corresponding auxiliary signals and combined with the main singal at each sample time will succeed in minimizing the undesired sidelobe interference by creating effective nulls in the direction of such interferences during reception. In the present invention the optimal weights are derived for a given batch of data samples consisting of M samples of main and auxiliary signals, namely, $$\{s_o(m)\}_{m=1}^M \text{ and } \{s(m)\}_{m=1}^M,$$

wherein $s_o$ designates the complex baseband main signal and s represents the auxiliary complex baseband signal vector whose components are corresponding individual auxiliary signals. Note here that M is chosen to be large enough so that the adaptive weight vector w may be computed within an M-sample time and subsequently applied to the same set (batch) of data that it was derived from. The m-th sample of the combined output signal will then be $$s_c(m) = s^T(m)w + s_o(m)$$

-continued $$= \sum_{n=1}^{N} s_n(m)w_n + s_o(m)$$

to do this, $$\{s_o(m)\}_{m=1}^{M} \text{ and } \{s(m)\}_{m=1}^{M}$$

must be preserved in storage such as a delay line memory (shift-register) means 44 and 41 respectively.

In some radar applications when the clutter return constitutes a substantial part of the received main signal $s_o$, it is necessary to remove most of this background interference before it is possible to deal effectively with the minimization of sidelobe interference. The fundamental reason for doing this is the desire to minimize any influence of clutter in the determination of the adaptive weight vector, w. In this embodiment the signals $s_o$ and s are applied to lutter precancelling apparatus 26 following the A/D conversion. Clutter recancelling techniques, including 2-pulse cancelling, are well-known to those skilled in the art and will not be elaborated upon herein.

FIG. 1 shows that sampled main and auxiliary signals $s_o$ and s are presented to the clutter precancelling apparatus 26 while at the same time they are stored in the delayline memories 44 and 41 which can store, in sequence, a batch of M main and auxilliary complex signal samples. At the output of the clutter precanceller 26, clutter precancelled signals $\tilde{s}_o$ and $\tilde{s}$ are produced having a substantially reduced amount of clutter, and proportionately more undesired interference than their original versions (at the input of the clutter precanceller 26). The clutter-precancelled signals $\tilde{s}_o$ and $\tilde{s}$ are subsequently used to compute the N×N complex covariance matrix C. a Hermitian (conjugate symmetric) matrix, and a forcing vector or cross-correlation N-vector b in computation unit 30. For convenience the clutter precancelled signals $\tilde{s}_o$ and $\tilde{s}$ will be designated simply by $s_o$ and s throughout the remainder of this description. These quantities, C and b, are defined by:

$$C = (s, s^T)$$

$$= \frac{1}{M} \sum_{m=1}^{M} s^*(m)s^T(m)$$

$$= \frac{1}{M} \sum_{m=1}^{M} \begin{bmatrix} s_1(m) \\ \vdots \\ s_N(m) \end{bmatrix}^* [s_1(m) \ldots s_n(m)]$$

$$= \frac{1}{M} \sum_{m=1}^{M} \begin{bmatrix} s_1(m)s_1^*(m) \ldots s_1(m)s_N^*(m) \\ \vdots \\ s_N(m)s_1^*(m) \ldots s_N(m)s_N^*(m) \end{bmatrix}$$

$$b = (s, s_o)$$

$$= \frac{1}{M} \sum_{m=1}^{M} s^*(m)s_o(m)$$

$$= \frac{1}{M} \sum_{m=1}^{M} \begin{bmatrix} s_1(m) \\ \vdots \\ s_N(m) \end{bmatrix}^* s_o(m)$$

Note that C is the covariance matrix of the auxiliary vector s computed as an average of outer product $s^*(m)s^T(m)$ over the M samples of a given batch. The cross-correlation vector b is the average of scaler-by-vector products $s^*(m)s_o(m)$ over the same M samples of the given data batch. Here * implies complex conjugacy.

The construction of the C and b computation unit 30 involves simply multiplications and accumulations which presents no difficulties to one skilled in the art of digital design. As such, the construction of this particular block wil be assumed to be well within the expertise of those skilled in the art, except that the memory is described in some detail to aide in the understanding of signals supplied thereby.

Figure 2:
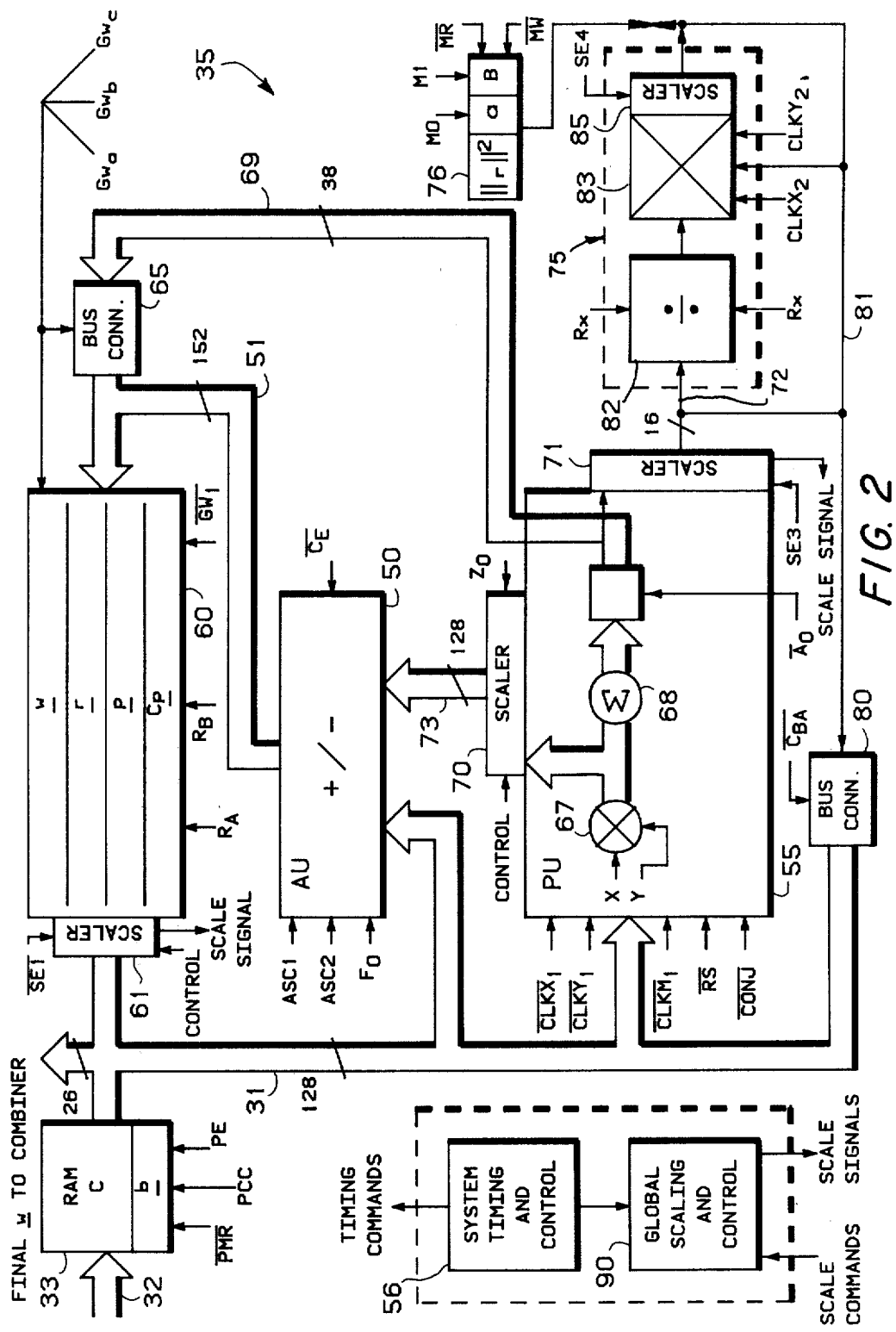
FIG. 2 is a detailed block diagram of the BCR Processor of FIG. 1.

In the present embodiment wherein N is equal to 4, the computation unit 30 of FIG. 1 supplies signals to a random access memory (RAM) 33 of FIG. 2 by way of a bus 32. The b vector arranged therein as a four word vector and the C matrix arranged therein in a 4×4 format. Each complex word involved is stored as a 32-bit 2's complement binary number, where the most significant set of sixteen bits represents the real part and the set of least significant bits represents the imaginary part. RAM 33 has a 128-bit storage capability per row, which allows for storage, in a single row, of the four complex words representative of b. The matrix C is stored in four additional rows with four complex words in each row. The data is accessed by row with a 128 wire data bus 31. The RAM storage means 33 is connected by means of the 128 wire data bus 31 to a batch covariance relaxation (BCR) processor 35. The RAM storage means 33 is an input storage means for the protocessor 35 and supplies the correct signals on command for the proper operation of the processor 35.

The desired adaptive weight vector, w, which satisfies the complex system of linear equations $$Cw + b = 0$$

is derived by BCR processor 35. More specifically, C and b, having been latched into RAM storage unit 33, become available to the BCR processor 35 via a 2BN-lead bus (where B is the number of bits for each real or imaginary word involved) thus transferring b first and, subsequently, one row of C at a time. The weight-vector solution w is then produced at the output of the BCR processor 35 within a batch-time of M samples and is made available at the input to an auxiliary signal combiner 40 at the precise time when the first sample of the auxiliary vector batch $$\{s(m)\}_{m=1}^{M}$$

reaches the output of the auxiliary signal vector delay memory 41.

The auxiliary signal combiner 40 simply generates the sample-by-sample weighted sum $$s^T(m)w = \sum_{n=1}^{N} s_n(m)w_n$$

which is done within a small number of sample times depending on the speed of multiplication and addition operations as anyone skilled in the art could determine. Letting L be the number of sample times needed to process the weighted sum, the main signal samples $s_o(m)$ need to be delayed by L sample times so that they may be combined coherently with the auxiliary signal weighted sum at a final summing stage 43 where the combined signal samples $$s_C(m) = s^T(m)w + s_o(m)$$

are formed.

The description of the delaying memories 44 and 41 may now be made more precise. If the BCR processor 35 requires M sample times to produce the desired weighting vector w, and since it will be applied to a corresponding batch of auxiliary signals $$\{s(m)\}_{m=1}^{M},$$

C and b will need to have been computed from its same batch which will take a total of M sample times. The total computational delay from the input to the C and b computation unit 30 and the output of the BCR processor 35 is 2M sample times. Considering that the clutter precanceller 26 will also have a delay of K samples (K = 1 for a two-pulse canceller), the auxiliary complex vector signal delay memory (41) length should consist of K + 2M register stages. By the same token, the main signal delay memory (44) length should be K + 2M + L.

Referring specifically to FIG. 2, the BCR processor 35 is illustrated in detail. The 128 wire data bus 31 carrying output information from the input RAM 33 is connected to one input of an arithmetic unit 50 and may be selectively connected to either an X or a Y input of a processing unit 55. A system timing and control block 56 provides timing commands to all of the various components illustrated in FIG. 2 and ensures the correct sequence of operations thereof, as will be described presently. The 128 wire bus 31 connected to the X and Y inputs of the processing unit 55 is actually connected to both inputs simultaneously and the timing signals from the block 56 determine the input, X or Y, to which the signal is applied. Similarly, the timing signals from the block 56 determine the application of the signals b and C from RAM 33 to the 128 wire bus 31.

In this embodiment, the number of bits per real or imaginary word of each signal sample is typically 10 (although it could be different, depending on A/D availability). At the output of the clutter precanceller 26, the required resolution will be 11 bits to avert any overflow in the case of a two-pulse canceller. Depending on the structure of the clutter precanceller 26 the number of bits per word may exceed 11. In the present invention, however, since the input resolution is only 10 bits, the clutter-precanceller signals may be represented with 12-bit words. Subsequently, at the C and b computation unit 30, the words comprising C and b may grow to be as large as $22 + \log_2^M$ when a two-pulse clutter precanceller is assumed. It suffices to represent C and b via a 16-bit word resolution, assuming appropriate upscaling has taken place such that the largest word in each quantity (C and b) is left-justified. This is done by shifting C a number of bits KC such that the largest word of C (real or imaginary) is fully left-justified. After this so-called local shifting of KC bits of all words in C, only the top 16 most significant bits are preserved. A similar local shift on b of KB bits followed by an appropriate truncation results in a 16-bit left-justified representation of b. As a consequence, the solution of $$Cw + b = 0$$

using these left-justified quantities will result in a weight vector w that is shifted up by KB-KC over its correct value. Consequently, this effect of prescaling must be corrected by postscaling after w is produced by the BCR processor 35.

The 16-bit left-justified representations of C and b are transferred from the C and b RAM 33 via a bus 31 one N-vector at a time. Specifically, when N=4, bus 31 is composed of 128 wires over which b is transferred first, followed by each row of C, as needed by the BCR processor.

Vector storage means 60 is connected through an adaptive scaling circuit 61 to the 128 wire bus 31. The vector storage means 60 is capable of storing four column vectors containing 160 bits each. The signals representative of the four column vectors are the complex weight vector, w, a complex residual vector, r, a relaxation (search) vector, p, and Cp, which is the complex N-vector that results from the multiplication of the matrix C and the vector p. The storage means 60 may be, for example, a random access memory (RAM) and in the present embodiment the required memory is implemented with forty 74LS670 IC's. Each IC stores four 4-bit words. Because of this particular IC configuration, it is convenient to allow twenty bits for each real or imaginary word comprising the components of the four complex vectors involved. From numerical considerations, each real or imaginary component of Cp requires nineteen bits of storage, for the present case where N=4. The particular signal being read out of the storage means 60 or written into the storage means 60 is controlled by the timing signals from the block 56. Input signals for the storage means 60 are received from the arithmetic unit 50 on a 152 wire bus 51, which is also connected to a bus-connect circuit 65. The input of the bus connect 65 is a 38 wire bus 69 and the bus connect circuit 65 serves to fan out the 38 bit signals received therein onto appropriate locations of the 152 wire bus 51 connected to the input of the vector storage means 60. Real or imaginary components of updated vectors w, r, and Cp at the output 51 of the arithmetic unit 50 may be accommodated with seventeen bits. Extended by two more bits, the updated vectors are presented to the vector RAM 60 via the same 152 wire bus that carries Cp.

The processing unit 55 contains circuitry which performs complex vector dot products, as well as matrix-vector products and scalar-vector products. The processing unit 55 includes multiplying circuitry 67 and summing circuitry 68. In the case of scalar-vector products involving a real scalar, the output may be taken directly from the multiplying circuitry 67. This output is supplied through a second adaptive scaling circuit 70 to a 128 wire bus 73 which is connected to a second input of the arithmetic unit 50. When performing complex vector dot products or matrix-vector products, the output signals are taken from the output of the summing circuitry 68. The 38 wire bus connected to the bus connect circuit 65 is connected to the output of the summing circuitry 68 to convey the N-vector Cp to the vector storage means 60 one complex component at a time. Other complex vector dot products resulting in positive real scalars are connected through a 16 wire bus 72 to either of two inputs to division means, generally designated 75, and to an input of scalar storage means 76. An output of the division means 75 is also connected to the scalar storage means 76 and the output of the division means 75 as well as the output of the scalar storage means 76 are connected by way of a 16 wire bus 81 to a bus connect circuit 80 which connects to the 128 wire bus 31. The bus connect circuit 80 operates on scalar signals applied thereto to fan out the signals in parallel to all 4 real-word locations of bus 31. The output of the scalar storage means 76 is also connected to the inputs of the division means 75.

The processing unit 55 may be constructed in a variety of embodiments to perform the described complex vector dot products and may be, for example, constructed in accordance with the teachings of a copending U.S. patent application entitled "Processing Unit", Ser. No. 132,963, filing date Mar. 24, 1980, and assigned to the same assignee. The division means 75 may be any circuitry which will perform the required functions and may be, for example, a high speed circuit including a division look-up table 82 and a real mutliplier 83 connected so that one input of the division means 75 is applied to an input of the division look-up table 82 and the other input is connected to one input of the real multiplier 83 with the output of the look-up table connected to a second input of the real multiplier 83. The output of the real multiplier 83 is connected through an adaptive scaling circuit 85 and serves as the output of the division means 75. A complete operation and description of the division means is taught and disclosed in a copending application entitled "Digital Divider", filed Nov. 19, 1979, Ser. No. 95,823 and assigned to the same assignee, now abandoned. The input applied to the division look-up table 82 will be the divisor while the input applied to the real multiplier 83 will be the dividend.

The adaptive scaling circuits 61, 71 and 85 are circuits designed to sense the position of the most significant bit in each digital word and apply a local shift as needed to left justify the maximum magnitude word comprising the vector or scalar quantity involved. Also, scaling circuits 61 and 70 may receive bit-shift commands from a global scaling and control block 90 in order to equalize the respective scales of quantities to be combined at the arithmetic unit 50. In the present embodiment the adaptive scaling takes the place of an AGC function throughout the computations thus guaranteeing maximum numerical resolution. Essentially, the scaling circuits 61, 71 and 85 attempt to shift words supplied therethrough so that optimun use of the number of bits in the word may be made. Scaling circuit 70 need not have such a local scale capability since left justification at the PU 55 gives rise to left-justified output quantities into network 70 within 1 bit. Each time a shift occurs, a scale signal is supplied to the global scaling and control block 90 accumulating there with previous shifts into a global scale associated with the particular quantity involved. When operations such as addition or subtraction via arithmetic unit 50 are performed, the global scaling and control block 90 supplies control signals to specific adaptive scaling circuits 61 and 70 to shift words supplied thereto so that the global scale signals coincide and the words can be added or substracted appropriately. The adaptive scaling circuits 61, 70, 71 and 85 may be constructed in accordance with the teachings of copending U.S. patent application entitled "Digital Scaling Apparatus", Ser. No. 134,859, filing date Mar. 28, 1980, and assigned to the same assignee.

The operation of the apparatus illustrated in FIG. 2 is generally as follows. The BCR process is an iterative procedure which uses the quantities C and b to solve the special system of N complex equations, $Cw+b=0$ for the weighting vector w, in at most N steps. The apparatus is initialized, or prepared for the operation, by assuming an initial value of $w^o$. Subsequent iterations produce improved estimates $w^1$, $w^2$, ..., $w^r$ where $w^r$ is the r-th estimate and happens to be a sufficiently good estimate of the desired solution to $Cw+b=0$. Here $r=\text{rank } C \leq N$; that is, the final result is obtained in, at most, N iterations (4 in the present configuration). More specifically, this is the case when $w^o=0$. Specialized to this initial estimate, the actual process carried out by the BCR processor is as follows.

The initialization of the BCR processor consists of defining the initial residual and search vectors $$r^o = Cw^o + b$$

$$p^o = r^o$$

respectively, where in the present case $r^o=b$, since $w^o$ was chosen to be 0. The initial value of w, r and p are loaded into the vector storage means 60. First, r and p, which are initially equal to b, are loaded by fetching b from the RAM 33 onto bus 31 and presenting them to the arithmetic unit 50 while simultaneously setting bus 73 to zero. Upon performing the addition at the AU 50 b appears at the bus 51 output and is loaded into the r location of the vector storage 60. Upon repeating this process, b is loaded in at the p location of the vector storage means 60. A "clear" command at the arithmetic unit 50 clears the bus 51 output allowing the loading of O into the w location of the vector storage means 60.

The initialization part of the BCR processor 35 is completed by computing the initial value of $\|r^o\|^2$, $\|b\|^2$, by first latching b into the X-port of the PU 55 and simultaneously presenting it to the Y-port. The end result is $$\|r^o\|^2 = \|b\|^2 = \sum_{n=1}^{N} |b_n|^2$$

where $|b_n|$ stands for the magnitude of the n-th complex component of vector b. This real quantity appears as a 19-bit number at the input of the scaling network 71 which subsequently extracts a left-justified 16-bit version that is finally transmitted to the scalar storage means 76 where it is stored in the $\|r\|^2$ location. Note that the scaling network 71 has a shift range (0,15) in the present embodiment. Further, the processing unit 55 includes switching means for conjugating one of the inputs so that the dot product of the complex vectors r and the conjugate of r is equal to the squared magnitude of r, $\|r\|^2$, the real scalar value that is applied by way of the scaling circuit 71 and bus 72 to the $\|r\|^2$ location in the scalar storage means 76. The BCR processor illustrated in FIG. 2 is now completely initialized and the steps described above are not repeated during the iterative portion.

The main part of the process carried out by the BCR processor 35 consists of an iterative updating procedure which evolves BCR vector variables w, r, and p by means of incremental changes according to relations $$w^{k+1} = w^k - \alpha k p^k$$

$$r^{k+1} = r^k - \alpha k C p^k$$

$$p^{k+1} = r^{k+1} + \beta_k d\ p^k \text{ for } k = 0, 1, \ldots, r \leq N, \text{ where}$$
$$r = \text{rank } C,$$

$$\alpha_k = \frac{\|r^k\|^2}{(p^k, Cp^k)}$$

$$\beta_k = \frac{\|r^{k+1}\|^2}{\|r^k\|^2}$$

$$(p, Cp) = \text{Re} \sum_{n=1}^{N} p_n (Cp)^*_n$$

Here, $\alpha_k$ is called the relaxation coefficient and $Cp$ is the complex N-vector that results from the multiplication of the $N \times N$ matrix $C$ by the N-vector $p$.

It suffices to explain the steps within one iteration of the BCR process following the initialization as described. The first computation performed is that of $Cp$. This is done by performing the needed N dot products involving consecutive rows of C and vector p by means of the PU 55. To accomplish this, p is loaded into the X input of the processing unit 55 from the vector storage means 60 by way of scaling circuit 61 and bus 31. It should be noted that during the first iteration, r equals p and r is also available at the X input from the initialization procedure. Now, the matrix C is loaded into the Y input of the processing unit from the input RAM 33 by way of the bus 31. To accomplish this, the matrix C is loaded into the Y input one row at a time and the componentwise results are supplied t the Cp portion of the vector storage means 60 by way of bus 69, bus connect circuit 65 and bus 51. This process continues until the total computation, or resultant 19 bit vector Cp is loaded compentwise into the vector storage means 60 in the designated Cp location.

With the Cp vector loaded into the vector storage means 60, one of the inputs X or Y of the processing unit 55 is switched so that the input is conjugated. A 16-bit left-justified version of the vector Cp is loaded into one of the X and Y inputs from the vector storage means 60 by way of scaling circuit 61 and bus 31. The vector p is still available at the other one of the X or Y inputs. A 19 bit scalar representative of the dot product (p, Cp), or p*$^T$Cp, is computed and presented to the scaling network 71 which produces a left-justified 16-bit version. The 16-bit left-justified real word is then presented to the look-up table 82, which, in turn, produces a 16-bit fully-justified version of its reciprocal to on input of the multiplier 83. During this process the signal $\|r\|^2$ is taken from the scalar storage means 76 and applied to the other input of the real multiplier 83. It should be noted that this value can be loaded into the real multiplier 83 after its initial calculation and during the time that it is being loaded into the scalar storage means 76. The output signal, $\alpha$, representative of the resulting real scalar is subsequently left-justified in the scaling circuit 85 and applied to the appropriate location of the scalar storage means 76. The signal $\alpha$ is also supplied by way of bus 81, bus connect circuit 80 and bus 31 to one of the inputs, X or Y, of the processing unit 55. The signal p is already available at the other one of the X or Y inputs and, with the switch operated so that conjugation does not occur, individual component multiplication of the two inputs are produced and the scalar-vector product $\alpha p$ becomes available at the output of the multiplying circuits 67. The product $\alpha p$, involving no summing in the circuits 68, is supplied through the scaling circuit 70 and bus 73 to one input of the arithmetic unit 50. Simultaneously, the current w signal, $w^k$, is loaded into the other input of the arithmetic unit 50 from the vector storage means 60 by way of the scaling circuit 61 and bus 31 resulting in the updated value $w^{k+1} = w^k - \alpha p^k$. The global scaling and control unit 90 keeps a complete account of bit shifts throughout the above procedure. The resultant updated weighting vector $w^{k+1}$ consists of two 17-bit words per component (real and imaginary parts) and is converted to two 19-bit words per component by attaching trailing zeros. Note that in order to perform this scale equalization function, scaling circuit 61 has bidirectional shifting capability while the scaling circuit 70 is capable of downshifts only. In the specific embodiment of FIG. 2, scaling circuit 61 has a shifting range of $-7$ to 8 and the scaling circuit 70 has a shifting range of $-15$ to 0. This updated w signal, $w^{k+1}$, is supplied to the proper location of the vector storage means 60 by way of the bus 51.

With the signal $\alpha$ still available at the X or Y inputs of the processing unit 55, the vector Cp is loaded into the other of the X or Y inputs from the vector storage means 60. The scalar-vector product of $\alpha Cp$ is applied to the arithmetic unit 50 way of the scaling circuit 70 and bus 73. The current r signal, $r^k$, representative of the complex residual vector is loaded into the other input of the arithmetic unit 50 from the vector storage means 60 and the two signals are added or combined to give the updated r signal, $r^{k+1}$. Thus, $r^{k+1} = r^k + \alpha Cp$. The updated r signal, $r^{k+1}$, is supplied to the appropriate location of the vector storage means 60 by way of bus 51.

Subsequently, the updated r signal, $r^{k+1}$, is applied to the X and Y inputs of the processing unit 55 from the vector storage means 60 and one of the inputs is switched to provide conjugation. The processing unit 55 performs the dot product to produce the real scalar signal $\|r^{k+1}\|^2$ which is subsequently supplied to the input of the real multiplier 83 by way of the scaling circuit 71 and bus 72. Simultaneously, the $\|r^k\|^2$ is brought from the scalar storage means 76 to the input of the look-up table 82 and the updated value $\|r^{k+1}\|^2$ is written into the appropriate location of the scalar storage means 76. The look-up table 82 provides an output signal, the reciprocal $1/\|r^k\|^2$, to the second input of the real multiplier 83. The output signal of the multiplier 83 is the signal $\beta_k$ which is left-justified in the scaling circuit 85 and applied to the appropriate storage location of the scalar storage means 76.

In addition to being applied to the scalar storage means 76, the signal $\beta_k$ is supplied by way of bus 81, bus connector circuit 80 and bus 31 to one of the inputs X or Y of the processing unit 55. The p signal is applied to the other input of the processing unit from the vector storage means 60 and the scalar-vector product, $\beta_k p^k$ is supplied through the scaling circuit 70 and bus 73 to the arithmetic unit 50. The current residual vector $r^k$ is available at the other input of the arithmetic unit 50 (from the previous computation) and the product $\beta p^k$ is added to the vector $r^k$ to provide an updated relaxation vector $p^{k+1}$. The updated relaxation vector is supplied to the correct location of the vector storage means 60, by way of bus 51. Thus, the complex weight vector w, the complex residual vector r, and the complex relaxation vector p are updated and the processor is prepared for a second iteration.

This procedure is repeated until $\|r\|^2$ attains a sufficiently small value. Since $r = Cw + b$, this says that $Cw + b$ is nearly zero in the mean-square sense and the solution w obtained satisfies $Cw+b=0$ within the numerical resolution of the BCR processor; namely, 16 bits in the present case. For this reason a reduction of $\|r\|^2$ by $2^{15}$ from its initial value is considered a reasonable stopping condition. This so-called convergence condition will occur at the end of r iterations, where $r=$ rank $C \leq N$. Since this implies a finite processing time, the BCR processor is suited for a batch process, as its name implies.

In the above described procedure, if $k+1$ equals N or the signal $\|r^{k+1}\|^2$ is less than a pre-assigned small number, the process is terminated. If neither of these values has been reached the $k+1$ (symbol for an updated value) is replaced by k (symbol for the current value) and another iteration is started by returning to the step immediately following the initialization steps; i.e., the compution Cp. Once the final iteration is performed, in accordance with the above described tests, the final signal w, representative of the complex weight vector, is supplied to the combining circuit 40 (FIG. 1). The final estimate of the weight vector w, the desired solution, is accessed as a 16 bit left-justified vector quantity via scaling circuit 61 or may be truncated to 12 or 8-bit representations before it is sent to the combining circuit 40. The choice made is a tradeoff between accuracy and complexity at the combining circuit 40.

It should be noted that in an alternate embodiment $\alpha$ and $\beta$ may be derived as follows:

$$\alpha_k = \frac{(p^k, r^k)}{(p^k, Cp^k)}$$

$$\beta_k = -\frac{(r^{k+1}, Cp^k)}{(p^k, Cp^k)}$$

The actual operation of the described circuitry will be apparent to those skilled in the art, from the above equations. Of course the timing diagram of FIG. 3 will not apply to this alternate embodiment since different expressions are being computed.

From the practical point of view, the BCR processor is designed to interrupt automatically in case of overflow and dynamic range violations. In particular, the positive real 16-bit scalar input to the division lookup table is monitored for full justification. If an input fails to possess of 01 pattern in its most-significant end, it will automatically detect it and affect a system interrupt. It should be mentioned that the weight vector in RAM 60 is still a valid estimate of the desired solution and could be used in case of a system interrupt. Similarly, a dynamic range system-interrupt will be detected when scale equalization cannot be achieved at the input to the AU (50) in performing a BCR vector update. In each case the BCR system is fully protected numerically, and thus constitutes an autonomous computationally robust system.

Figure 3A:
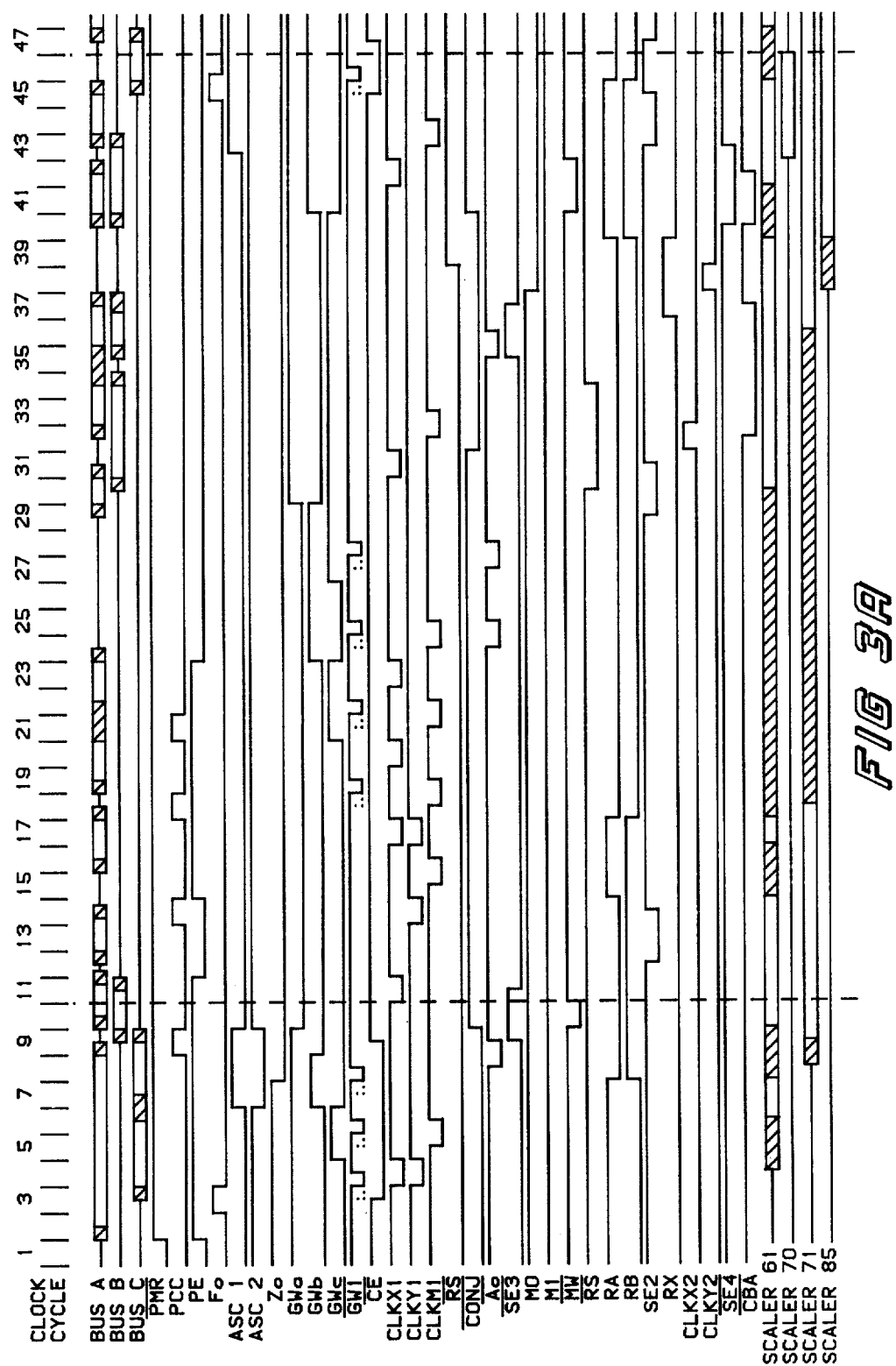
FIG. 3A and 3B is a timing diagram for the apparatus of FIG. 2.
Figure 3B:
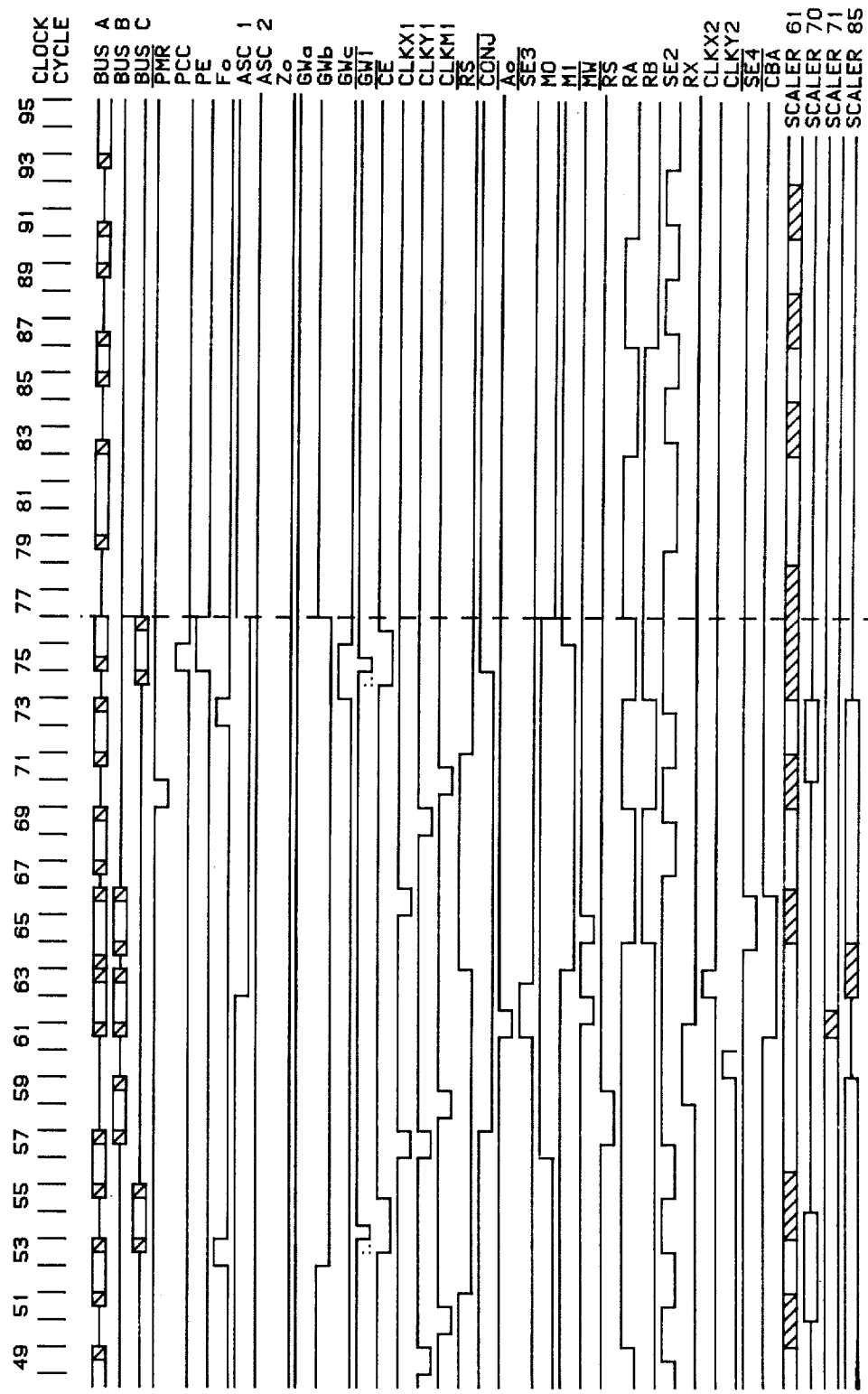

FIG. 3 illustrates a typical timing sequence for the apparatus of FIG. 2 and the above described procedure. Inputs for the various timing signals are shown in FIG. 2 and a description of each timing signal is listed in the following chart. Any further description of the timing and control block 56 would unduly complicate the present description and is not necessary to a complete understanding of the invention. Furthermore, it should be noted that the timing diagram of FIG. 2 is not unique and variations thereof could be obtained by one skilled in the art and aware of the overall system description already given.

| SIGNAL | DESCRIPTION |
|---|---|
| | Input Control |
| $\overline{PMR}$ | Input Counter Master Reset |
| PCC | Input Counter Clock |
| PE | Input Bus A Enable Command |
| | AAU Control |
| $F_0$ | Bus A Input Storage Clock |
| ASC1 | Add/Subtract/Clear Command (LSB) |
| ASC2 | Add/Subtract/Clear Command (MSB) |
| | Column Vector Storage Control |
| $GW_a$ | Memory Write Address (LSB) |
| $GW_b$ | Memory Write Address |
| $GW_c$ | Memory Write Address (MSB) |
| $\overline{GWI}$ | Memory Write Command |
| $\overline{SEI}$ | Scalar 1 to Bus A Enable Command |
| $R_A$ | Memory Read Address (LSB) |
| $R_B$ | Memory Read Address (MSB) |
| | CPU Control |
| $\overline{CLKX_1}$ | Complex Multiplier X-Input Clock |
| $\overline{CLKY_1}$ | Complex Multiplier Y-Input Clock |
| $\overline{CLKY_1}$ | Complex Multiplier Output Clock |
| $\overline{RS}$ | Multiply Overflow Protect Command |
| $A_0$ | Real (p,Cp) Temporary Storage Clock |
| $\overline{CONJ}$ | Conjugate Multiplication Control at Summer |
| SE3 | Scalar 3 Output to Bus B Enable Command |
| $Z_0$ | Zero Input at CPU Port |
| | Real Scalar Control |
| $R_X$ | Division Table Read Command |
| $CLKX_2$ | Real Multiplier X Input Clock |
| $CLKY_2$ | Real Multiplier Y Input Clock |
| $\overline{SE4}$ | Scalar 4 Output to Bus B Enable Command |
| $\overline{C_{BA}}$ | Bus B to Bus A Connect Enable Command |
| M0 | Real Memory Address (LSB) |
| M1 | Real Memory Address (MSB) |
| $\overline{MW}$ | Real Memory Write Command |
| $\overline{MR}$ | Real Memory Read Command |

Figure 4:
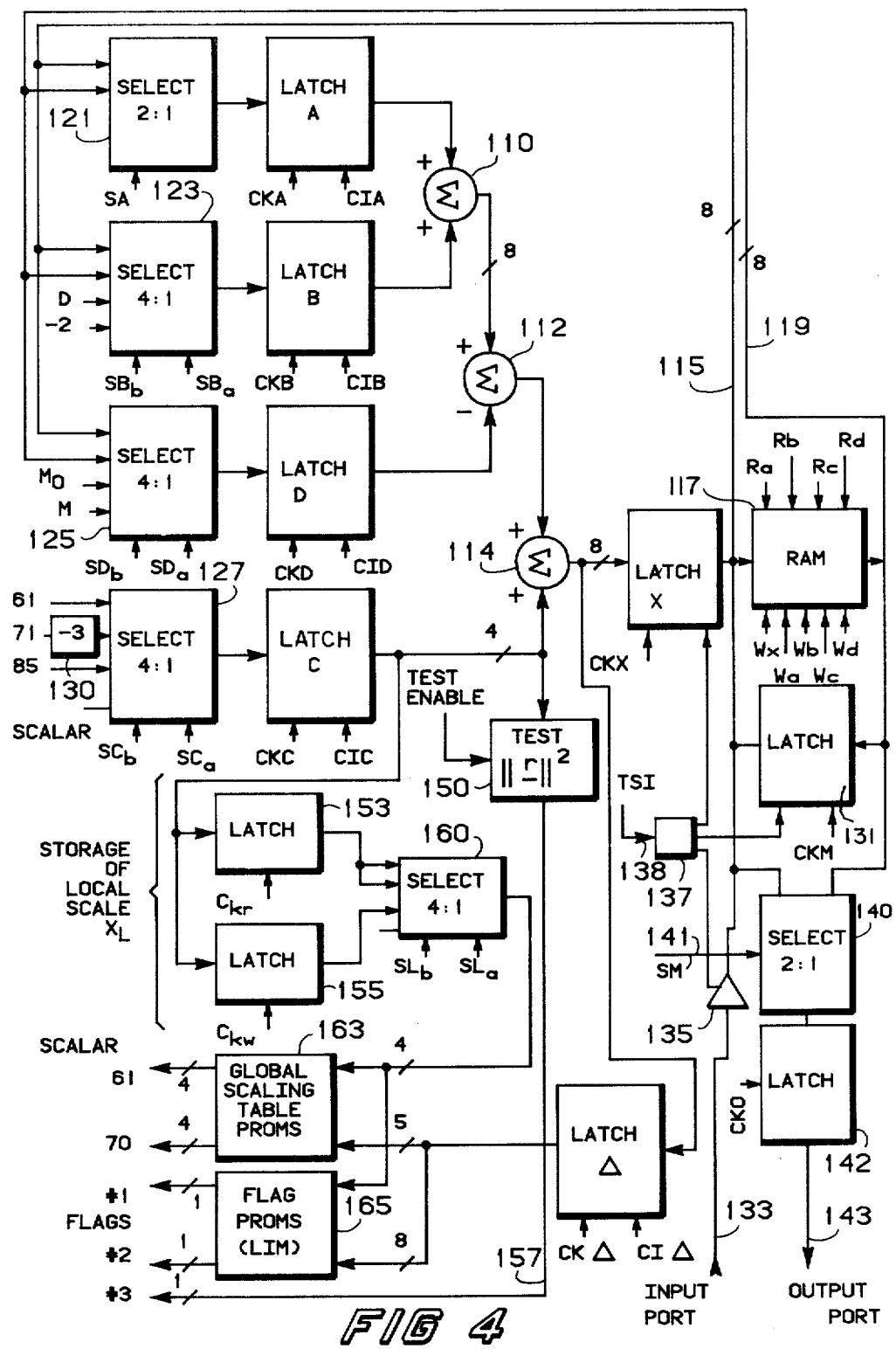
FIG. 4 is a functional block diagram of a global scaling unit embodying the present invention.

Referring specifically to FIG. 4, a functional block diagram of a global scaling and control unit 90 is illustrated. The unit 90 includes four latch circuits designated A, B, C and D. Each of the latches is basically a flip-flop circuit with inputs designated D and outputs by Q except in the case of latch D whose output is the inverted version, $\overline{Q}$. The outputs of the latches A and B are connected to a combining 110 circuit so as to provide a sum of the two outputs at an output of the combining circuit 110. The output of the combining circuit 110 and the output of the latch D are applied to a second combining circuit 112 so as to subtract the latch D output from the sum of the latch A and B outputs. The output of the combining circuit 112 is applied to a third combining circuit 114 along with the output of the latch C so as to provide an output which is the sum of the two inputs, which output is applied to the input D of a latch X and the input D of a latch Δ. An output Q of the latch X is applied to a bus 115 and to a random access memory (RAM) 117. An output of the RAM 117 is connected to a bus 119. A one-of-two selecting circuit 121 has an output connected to the D input of the latch A and two inputs connected to the buses 115 and 119, respectively. A one-of-four selecting circuit 123 has an output connected to the D input of the latch B and four inputs, one of which is connected to the bus 115, one of which is connected to the bus 119, one of which is connected to receive a D input (to be explained presently) and the fourth of which is connected to receive a digital signal representative of a negative two. A one-of-four selecting circuit 125 has an output connected to the D input of the latch D and four inputs, one of which is connected to the bus 115, one of which is connected to the bus 119, one of which is connected to receive a signal $M_o$ (to be explained presently) and the fourth input is connected to receive a signal M (to be explained presently). A third one-out-of four selecting circuit 127 has an output connected to the D input of the latch C and four inputs, one of which is connected to the scale signal output of the scaling circuit 61, a second of which is connected to the scale signal output of the scaling circuit 71 through a circuit 130 that automatically shifts the signal by a negative three bits, the third of which is connected to the scale signal output of the scaling circuit 85 and the fourth of which is not used (see scaling circuits in FIG. 2). The selecting circuit 121 has a single selection control input while each of the selection circuit 123, 125 and 127 have two selection control inputs, as is well known in the art. Each of the latches A, B, C and D have a clock input and a clear input.

Information on bus 119 may be conveyed to the bus 115 through a latch 131. An input port 133 is provided for initial information pertaining to shifts of the matrix C or vector b prior to application to the BCR processor 35. Information at the input port 133 is applied to the bus 115 through an input buffer 135. An input selection circuit 137 has an input 138, adapted to receive an input selection signal, and three outputs connected to the latch X, the latch 131 and the input buffer 135. The circuit 137 activates one of the latches X or 131, or input buffer 135 in response to a signal at the input 138, in order to supply appropriate signals to bus 115.

Buses 115 and 119 are also connected to a one-of-two selecting circuit 140 having a selecting input 141 and connected to supply information from either the bus 115 or the bus 119 to an output latch 142, in response to a selecting signal at the input 141. The latch 142 supplies the selected information to an output port 143, which, in turn, supplies the correct scaling information for the final weighting vector w.

The output of the latch C, in addition to being applied to the combining circuit 114, is applied to an input of a test circuit 150 and to the D inputs of a pair of latches 153 and 155. The test circuit 150 also has a test enable input which allows the test circuit 150 to compare the input from the latch C to a predetermined value of the quantity $\|r\|^2$. If the test is positive a signal appears at the output of the test circuit 150 at terminal 157. This output signal is referred to as FLAG #3 and indicates the completion of the BCR process. Outputs of the two latches 153 and 155 are applied to inputs of a one-of-four selecting circuit 160, the output of which is applied to one input of global scaling table PROMs 163 and one input of FLAG PROMs 165. Second inputs of each of the PROMs 163 and 165 are connected to a Q output of the latch Δ. The global scaling table PROMs 163 provide scaling command outputs to the scaling circuits 61 and 70 (shown in FIG. 2). The FLAG PROMs 165 provide FLAGs #1 and #2 first and second flags, which will be explained presently.

Among the important functions performed by the global scaling and control unit 90 are the following:

1. Real-time calculation of global scaling values for all BCR variables as they are augmented in the various arithmetic operations performed using
    (a) Local scaling values from the scaling circuits 61, 71 and 85.
    (b) Normalization or truncation constants for
        (1) Multiplication
        (2) Division
        (3) Addition
    (c) Global scaling values from past and present iterations.

2. Real-time calculation of relative scaling value for the proper operation of the auxiliary unit 50, involving appropriate control of the scaling circuits 61 and 70.

3. Detection of two stopping criteria, namely,
    (a) Local upshift of $\|r\|^2$ or (p, Cp) at the scaling circuit 71 attains a maximum of 15 bits. A FLAG #3 designation is used upon detection of this criterion.
    (b) Relative shift for the operation of the arithmetic unit 50 involving the scaling circuits 61 and 70 exceeds their capabilities. FLAGS #1, #1a, and #2 are associated with the detection of this stopping criterion.

The block diagram of FIG. 4 displays the essential aspects of the global scaling unit 90. Five D-type flip-flops comprise latches, A, B, C, D and X, for storing data at various stages of summation in the unit 90. Each of the latches A, B, C, and D has a selector circuit associated therewith for selecting specific data in response to timing signals applied thereto. The captured final sum at latch X is available for further storage in RAM 117 or immediate transfer back to latches A, B or D via bus 115 for use in the next calculation. Also, data residing in RAM 117 may be routed to latches A, B or D via bus 119. Latch C is used to receive and hold scale values from scaling circuits 61, 71 and 85.

In the configuration shown, unit 90 performs the operation $$X = A + B + C - D \qquad (201)$$

the general relation used to update all global scale values of the BCR variables. If, for some reason, any of the latches do not need to hold data for the specific calculation at hand, their outputs are cleared to zero.

The indicated memory block 117 is comprised of 4×4 RAM's (see FIG. 4) capable of storing 16 8-bit scale values. These IC's have separate input and output ports. Data entering from bus 115 is accessed via bus 119. Two read-write IC's control the address at which data is written-in or read-out in response to write or read timing signals applied thereto.

The global scaling PROM table 163 generates the appropriate bit-shift commands for scaling circuits 61 and 70, associated with the updating of BCR vectors w, r, and p by means of the arithmetic unit 50. This block takes the local scale coefficient, at latch C, of the vector to be updated and, taking into account its relative shift with respect to the input to latch X, generates corresponding shift commands. In addition, this block monitors these data in case a stopping condition has been satisfied; namely, condition (b) mentioned before.

Bus interface circuits, including selection circuit 137, latches 131 and 142, selection circuit 140 and buffer 135, perform the following important functions:

1. Transferring of data from RAM 117 via bus 119, to bus 115 for subsequent relocation in the RAM 117.

2. Receiving of input port 133 data to initialize stored scaler coefficients in RAM 117 at beginning of the BCR process.

3. Accessing scale data in RAM 117 via bus 115 or bus 119 at the output port 143 for subsequent unloading.

For simplicity and easy association, the scale coefficients will be denoted as subscripted versions of their corresponding BCR variables. For example, $w_L$, $w_g$ and $w_G$ will represent local, RAM-stored temporary global (scale of w as stored in the column vector RAM 60) and global (as addressed at bus 31 after appropriate shift command) scale values of vector w at various states in the BCR adaptive fixed-point arithmetic process. Definitions of subscripts L, g and G are given in Table 1.

TABLE 1

| SUBSCRIPT | Scale-Subscript Denotation REMARKS |
|---|---|
| L | Local scale identifier. Variables bearing this subscript are scale quantities representing the maximum possible upshift of a BCR variable toward full significance as carried out by the scaling circuits 61, 71 and 85. |
| g | Global scale identifier. Variables with this subscript; namely, w, r and p, are global scale values of these quantities as they reside in the column vector storage RAM 60. |
| G | Global scale identifier. Variables with this subscript are global scale values of BCR variables upshifted maximally by local scaling, or shifted approximately by command. |

An exhaustive list of scaling coefficients and their definitions using the subscript notation explained above, is given in Table 2.

TABLE 2

| Complete List of BCR Scaling Coefficients | |
|---|---|
| SUBSCRIPT NOTATION | REMARKS |
| $r_L^2$ | Local scale of $\|r\|^2$ from scaling circuit 71 |
| $r_G^2$ | Calculated global scale of $\|r\|^2$ |
| $Cp_L$ | Local scale of Cp from scaling circuit 61 |
| $Cp_G$ | Calculated global scale of Cp |
| $pCp_L$ | Local scale of (p,Cp) from scaling circuit 71 |
| $pCp_G$ | Calculated global scale of (p,Cp) |
| $1/pCp_G$ | Global scale (not calculated) included in partial sum $X_1$ (Table 3) |
| $\alpha_L$ | Local scale of $\alpha$ from scaling circuit 85 |
| $\alpha_g$ | Calculated global scale of $\alpha$ |
| $\alpha p_G$ | Calculated global scale of $\alpha p$ |
| $w_G$ | Global scale of w |
| $\alpha p_G$ | Global scale of $\alpha p$ |
| $\Delta w$ | Relative shift $\alpha p_G - w_G$ |
| $w_g$ | Global scale of w in vector storage RAM 60 |
| $w_L$ | Local scale of w from scaling circuit 61 |
| $w_G$ | Calculated global scale of w |
| $\alpha Cp_G$ | Calculated global scale of $\alpha Cp$ |
| $1/r_G^2$ | Calculated global scale of $1/\|r\|^2$ |
| $r_G$ | Global scale of w |
| $\alpha Cp_G$ | Global scale of $\alpha Cp$ |
| $\Delta r$ | Relative shift $\alpha Cp_G - r_G$ |
| $r_g$ | Global scale of r in vector storage RAM 60 |
| $r_L$ | Local scale of r from scaling circuit 61 |
| $r_G$ | Calculated global scale of r |
| $\beta_L$ | Local scale of $\beta$ from scaling circuit 85 |
| $\beta_G$ | Calculated global scale of $\beta$ |
| $\beta p_G$ | Calculated global scale of $\beta p$ |

TABLE 2-continued

| Complete List of BCR Scaling Coefficients | |
|---|---|
| SUBSCRIPT NOTATION | REMARKS |
| $r_G$ | Global scale of r |
| $\beta p_G$ | Global scale of $\beta p$ |
| $\Delta p$ | Relative shift $\beta p_G - r_G$ |
| $p_g$ | Global scale of p in RAM |
| $p_L$ | Local scale of p from scaling circuit 61 |
| $p_G$ | Calculated global scale of p |

Table 3 lists six important partial sums useful in optimizing the speed of the process for unit 90. Specifically, during the updating of vectors w, r and p by means of the arithmetic unit 50, scaling circuits 61 and 70 must be commanded by the relative scaling control of the unit 90. The inputs to this scaling control are the differential scale values $\Delta w$, $\Delta r$, $\Delta p$ which are calculated in the summing loop (latches, A, B, C, D and X). In order to generate these differentials in a time-optimal manner, six partial sums are computed in advance and stored in RAM 117 where they remain available for subsequent computations.

TABLE 3

| Six Important Partial Sums | |
|---|---|
| LABEL | RELATION* |
| $X_1$ | $D + r_G^2 - M_0$ |
| $X_{12}$ | $X_1 + (p_G - M_0)$ |
| $X_{123}$ | $X_{12} - w_G$ |
| $Y_1$ | $1/r_G^2 - M_0$ |
| $Y_{12}$ | $Y_1 + (p_G - M_0)$ |
| $Y_{123}$ | $Y_{12} - r_G$ |

*Refer to Table 4 for definitions of D and $M_0$

Finally, Table 4 gives three important hardware constants associated with multiplication and division.

TABLE 4

| Hardware Constants | |
|---|---|
| CONSTANT | DEFINITION |
| M | Multiplier 67 (FIG. 2) normalization or truncation constant of 16 bits. Note that in this case overflow protection option has been invoked by setting RS = 1. |
| $M_0$ | Multiplier 67 truncation constant of 15 bits when overflow protection not necessary by setting RS = 0. |
| D | Division table 82 implicit scale of 29 bits. |

Scaling circuit 61 is designed to provide a bit-shifting range from +8 to −7 bits. As such, this circuit offers the capability of full left-justification of input words within the positive limit of 8 bits. The negative bit-shift capability is reserved for a potential downshift requirement for the purpose of scale equalization in the updating process involving the arithmetic unit 50.

Consider, more specifically, the interfacing of the 17-bit updated vectors w, r and p at the bus 51 output of the arithmetic unit 50 all the way through scaling circuit 61 as 16-bit quantities at bus 31. By virtue of MSB alignment, there is an immediate 1-bit trunction. The binary shift code representing the 16 possible states ranges from 0 to 15. Consequently, this range is decoded to the desired range of −7 to +8 in accordance with the intended design. Considering the hardware truncation of the one bit mentioned, the decoded range becomes −8 to +7 as indicated in Table 5. Practically, the decoded shift is achieved by subtracting 8 from the corresponding coded shift. This number is then transferred and stored into latch C of the global scaling unit 90.

TABLE 5

Binary Shift Code, Hardware Shift and Effective Shift Provided by Scaling Circuit 61 to BCR Variables w, r, and p.

| SHIFT CODE | HARDWARE SHIFT | EFFECTIVE SHIFT (with 1-bit truncation) |
|---|---|---|
| +15 | +8 | +7 |
| +14 | +7 | +6 |
| +13 | +6 | +5 |
| +12 | +5 | +4 |
| +11 | +4 | +3 |
| +10 | +3 | +2 |
| +9 | +2 | +1 |
| +8 | +1 | 0 |
| +7 | 0 | −1 |
| +6 | −1 | −2 |
| +5 | −2 | −3 |
| +4 | −3 | −4 |
| +3 | −4 | −5 |
| +2 | −5 | −6 |
| +1 | −6 | −7 |
| +0 | −7 | −8 |

On the other hand, when the 19-bit Cp vector is accessed at bus 31, it experiences a truncation of 3 bits. Since, as mentioned above, a 1-bit downshift is already included in the decoded shift value, an additional adjustment of −2 must be made in the effective shift experienced by Cp when transferred from RAM 60 onto bus 31. The −2 is a constant which is applied to one of the inputs of the selecting circuit 123.

Scaling circuit 70 is designed to provide from 0 to 15 downshifts. The reason for no upshift is that quantities entering this network are guaranteed a priori to be within one bit from full significance. As such this scaling network does not send local scaling information to global scaling unit 90. Instead, it is commanded by unit 90 to downshift an amount necessary for scale equalization in the updating of vectors w, r and p. In this case coded and decoded shifts are identical.

Scaling circuit 71 provides from 0 to 15 bits of upshift to the real 19-bit quantities $\|r\|^2$ and (p,Cp) prior to transferring the 16 most significant bits onwards. As a consequence, the decoded shift returned to unit 90 at the input to the one-of-four selector 127 preceding latch C is 3 less than the actual shift. This 3-bit truncation is accomplished by the circuit 130, which biases the input signal so that a zero-shift becomes a negative-three-shift and a shift of fifteen becomes a shift of twelve. This function is accomplished by a four bit adder (see FIG. 5). However, since a sign-bit is now required to differentiate between negative and positive shifts two gates are included to generate this sign bit.

The local shift provided by scaling circuit 85 to BCR variables $\alpha$ and $\beta$ is wired directly to the one-of-four selector 127 at latch C.

The global scaling calculations carried out by the unit 90 may be subdivided into three partitions associated with timing windows that range from 1 to 95 (see timing chart, FIG. 3). These partitions are, specifically, 1. Initialization. This partition, occupying timing windows 1 through 10, sets up initial conditions of the BCR process.

2. Main Loop. This partition, covering timing windows 11 through 76, performs the necessary computations for a complete BCR iteration. Of course, this is repeated over the number of iterations executed.

3. Timing windows 77 through 95 are devoted to providing final values of certain BCR variables onto a paper terminal if desired.

Note there that one-of-four data selectors route the appropriate data into each of the latches B, C and D and a 2:1 data selector routes data into latch A for subsequent computation. In the 4:1 data selectors 123, 125 and 127 a zero on each of the two selection inputs causes the circuit to select the data on the first, or upper illustrated, data input. A zero on the left and a one on the right selection inputs causes the circuit to select the data on the second data input. A one on the left and a zero on the right causes the selection of the third data input and a one on both selection inputs causes the circuit to select the fourth, or lower, data input. Table 6 summarizes the global scaling computations starting with BCR initial conditions. Table 7 lists scale quantities that are stored in the RAM 117 of unit 90.

TABLE 6

Global Scaling Computations

| | X | = | A | + | B | + | C | − | D |
|---|---|---|---|---|---|---|---|---|---|
| | | | Initial Conditions | | | | | | |
| | | | $r_g = p_g = w_g = 0$ | | | | | | |
| | $r_G$ | = | $r_g$ | + | 0 | + | $r_L$ | − | 0 |
| | $r_G^2$ | = | $r_G$ | + | $r_G$ | + | $r_L^2$ | − | M |
| | | | Main Loop | | | | | | |
| (1) | $p_G$ | = | $p_g$ | + | 0 | + | $p_L$ | − | 0 |
| (2) | $X_1$ | = | $r_G^2$ | + | D | + | 0 | − | $M_0$ |
| (3) | $w_G$ | = | $w_g$ | + | 0 | + | $w_L$ | − | 0 |
| (4) | $1/r_G^2$ | = | 0 | + | D | + | 0 | − | $r_G^2$ |
| (5) | $Y_1$ | = | $1/r_G^2$ | + | 0 | + | 0 | − | $M_0$ |
| (6) | $Y_{12}$ | = | $p_G$ | + | $Y_1$ | + | 0 | − | $M_0$ |
| (7) | $X_{12}$ | = | $p_G$ | + | $X_1$ | + | 0 | − | $M_0$ |
| (8) | $X_{123}$ | = | 0 | + | $X_{12}$ | + | 0 | − | $w_G$ |
| (9) | $Cp_G$ | = | $p_G$ | + | −2 | + | $Cp_L$ | − | M |
| (10) | $pCp_G$ | = | $p_G$ | + | $Cp_G$ | + | $pCp_L$ | − | M |
| (11) | $\Delta w$ | = | 0 | + | $X_{123}$ | + | $x_L$ | − | $pCp_G$ |
| | At first iteration $\Delta w = 0$ | | | | | | | | |
| (12) | $\alpha p_G$ | = | 0 | + | $X_{12}$ | + | $x_L$ | − | $pCp_G$ |
| (13) | $w_g = \min(\alpha p_G, W_G)$ | | | | | | | | |
| | At first iteration $w_g = \alpha p_G$ | | | | | | | | |
| | Latest EXIT at 4-th iternation | | | | | | | | |
| (14) | $\alpha_G$ | = | 0 | + | $X_1$ | + | $\alpha_L$ | − | $pCp_G$ |
| (15) | $\alpha Cp_G$ | = | $\alpha_G$ | + | $Cp_G$ | + | 0 | − | $M_0$ |
| (16) | $\Delta_r$ | = | $\alpha Cp_G$ | + | 0 | + | 0 | − | $r_G$ |
| (17) | $r_g = \min(\alpha Cp_G, r_G)$ | | | | | | | | |
| (18) | $r_G$ | = | $r_G$ | + | 0 | + | $r_L$ | − | 0 |
| (19) | $Y_{123}$ | = | $Y_{12}$ | + | 0 | + | 0 | − | $r_G$ |
| (20) | $r_G^2$ | = | $r_G$ | + | $r_L^2$ | − | M | | |
| | Early EXIT according to convergence criterion | | | | | | | | |
| (21) | $\Delta p$ | = | $Y_{123}$ | + | $r_G^2$ | + | $\beta_L$ | − | 0 |
| (22) | $\beta p_G$ | = | $Y_{12}$ | + | $r_G^2$ | + | $\beta_L$ | − | 0 |
| (23) | $p_g = \min(\beta p_G, r_G)$ | | | | | | | | |
| (24) | $\beta_G$ | = | $Y_1$ | + | $r_G^2$ | + | $\beta_L$ | − | 0 |

TABLE 7

RAM 117 Global Memory Contents

| 1. | $w_g$ | 5. | $r_g$ | 9. | $X_{12}$ | 13. | $Y_{123}$ |
|---|---|---|---|---|---|---|---|
| 2. | $w_G$ | 6. | $r_G$ | 10. | $X_{123}$ | 14. | $Cp_G$ |
| 3. | $p_g$ | 7. | $r_G^2$ | 11. | $Y_1$ | 15. | $\alpha_G$ |
| 4. | $p_G$ | 8. | $X_1$ | 12. | $Y_{12}$ | 16. | $\beta_G$ |

Consider Table 6. Shown there, under initialization, are three operations. The first operation involves entering the value 0 at the input port 133 and loading it into RAM 117 at scale locations $r_g$, $p_g$ and $w_g$. The next operation uses the summing loop to calculate the initial value of $r_G$. As indicated, this is accomplished by loading the $r_g$ value from memory (RAM 117) into latch A, clearing latches B and D, and reading the local scale output from scaling circuit 61 into latch C. The sum, $r_G$ is clocked into latch X. From there it is stored in memory (RAM 117), and simultaneously clocked into latches A and B for the next calculation. In addition to loading $r_G$ into latches A and B, the calculation of the initial $r_G^2$ requires that the local scale output from scaling circuit 71 be loaded into latch C and the multiplication constant M be selected and loaded into latch D. The sum, $r_G^2$, is clocked into latch X and stored in memory (RAM 117) for use during the first pass through the main loop. This completes the initialization calculations.

Steps (1) through (24) of Table 6 constitute the calculations for determining and updating the global scales of the BCR variables over a complete iteration. This socalled main loop is repeated a number of times not exceeding N, the dimensionality of the multisensor system. For the present four-channel BCR processor design the loop repeats at most four times and exits after step (13). Under normal arithmetic conditions, the exit may occur after step (20), at some earlier iteration, provided the global scale $r_G^2$ computed there is sufficiently smaller than its initially computed value. The test circuit 150 constitutes a series of gates which monitor the value of $\| r \|^2$ and when that value reaches a predetermined number (15 bits in the present embodiment) the circuit 150 provides an exit or stopping signal herein referred to as FLAG#3.

The summing loop operates in the same manner as in the initialization part of the process, selecting, summing, and storing global scales and partial sums. Equations for calculating relative shift commands $\Delta w$, $\Delta r$ and $\Delta p$ are given by expression (11), (16), and (21) of Table 6, respectively. As generated, each is clocked into a dedicated latch $\Delta$ which, subsequently, supplies the relative shift command to the global scaling PROMs 163.

An exhaustive table of the relative scale control (as provided via PROMs 163 and 165) associated with the vector updating stage of the BCR process is given in Table 8. Its function is to receive the incremental scale value $\Delta$ from latch $\Delta$ and derive appropriate shift commands for scaling circuits 61 and 70 provided they fall within feasible regions. FLAGs #1, #1a and #2 are used to indicate unacceptable values for $\Delta$, values which fall outside the numerical range implemented in the BCR implementation.

More specifically, the relative scale control using a lookup table (PROMs 163) of 243 feasible states shown in Table 8 provides two 4-bit shift commands to scaling circuits 61 and 70, respectively. These commands are addressable by a 9-bit word whose top 5 bits represent the incremental scale $\Delta$. The bottom 4 bits of the address constitute the local scale $x_L$ as detected at scaling circuit 61.

TABLE 8

GSU Shift Command Generation ($x_s/y_s$) via Address ($\Delta$, $x_L$).
Here, 1, 2 and 1a denote FLAG (1-3) and FLAG (1-4).

| RELATIVE SHIFT $\Delta$ | SCALING CIRCUIT 61 LOCAL SCALE $x_L$ | | | | | | | | |
|---|---|---|---|---|---|---|---|---|---|
| | −1 | 0 | +1 | +2 | +3 | +4 | +5 | +6 | +7 |
| −16 thru −128 | 1 | 1 | 1 | 1 | 1 | 1 | 1 | 1 | 1 |
| −15 | 2 | 2 | 2 | 2 | 2 | 2 | 2 | 2 | 0/0 |
| −14 | 2 | 2 | 2 | 2 | 2 | 2 | 2 | 0/0 | +1/0 |
| −13 | 2 | 2 | 2 | 2 | 2 | 2 | 0/0 | +1/0 | +2/0 |
| −12 | 2 | 2 | 2 | 2 | 2 | 0/0 | +1/0 | +2/0 | +3/0 |
| −11 | 2 | 2 | 2 | 2 | 0/0 | +1/0 | +2/0 | +3/0 | +4/0 |
| −10 | 2 | 2 | 2 | 0/0 | +1/0 | +2/0 | +3/0 | +4/0 | +5/0 |
| −9 | 2 | 2 | 0/0 | +1/0 | +2/0 | +3/0 | +4/0 | +5/0 | +6/0 |
| −8 | 2 | 0/0 | +1/0 | +2/0 | +3/0 | +4/0 | +5/0 | +6/0 | +7/0 |
| −7 | 0/0 | +1/0 | +2/0 | +3/0 | +4/0 | +5/0 | +6/0 | +7/0 | +8/0 |
| −6 | +1/0 | +2/0 | +3/0 | +4/0 | +5/0 | +6/0 | +7/0 | +8/0 | +9/0 |
| −5 | +2/0 | +3/0 | +4/0 | +5/0 | +6/0 | +7/0 | +8/0 | +9/0 | +10/0 |
| −4 | +3/0 | +4/0 | +5/0 | +6/0 | +7/0 | +8/0 | +9/0 | +10/0 | +11/0 |
| −3 | +4/0 | +5/0 | +6/0 | +7/0 | +8/0 | +9/0 | +10/0 | +11/0 | +12/0 |
| −2 | +5/0 | +6/0 | +7/0 | +8/0 | +9/0 | +10/0 | +11/0 | +12/0 | +13/0 |
| −1 | +6/0 | +7/0 | +8/0 | +9/0 | +10/0 | +11/0 | +12/0 | +13/0 | +14/0 |
| 0 | +7/0 | +8/0 | +9/0 | +10/0 | +11/0 | +12/0 | +13/0 | +14/0 | +15/0 |
| +1 | +7/−1 | +8/−1 | +9/−1 | +10/−1 | +11/−1 | +12/−1 | +13/−1 | +14/−1 | +15/−1 |
| +2 | +7/−2 | +8/−2 | +9/−2 | +10/−2 | +11/−2 | +12/−2 | +13/−2 | +14/−2 | +15/−2 |
| +3 | +7/−3 | +8/−3 | +9/−3 | +10/−3 | +11/−3 | +12/−3 | +13/−3 | +14/−3 | +15/−3 |
| +4 | +7/−4 | +8/−4 | +9/−4 | +10/−4 | +11/−4 | +12/−4 | +13/−4 | +14/−4 | +15/−4 |
| +5 | +7/−5 | +8/−5 | +9/−5 | +10/−5 | +11/−5 | +12/−5 | +13/−5 | +14/−5 | +15/−5 |
| +6 | +7/−6 | +8/−6 | +9/−6 | +10/−6 | +11/−6 | +12/−6 | +13/−6 | +14/−6 | +15/−6 |
| +7 | +7/−7 | +8/−7 | +9/−7 | +10/−7 | +11/−7 | +12/−7 | +13/−7 | +14/−7 | +15/−7 |
| +8 | +7/−8 | +8/−8 | +9/−8 | +10/−8 | +11/−8 | +12/−8 | +13/−8 | +14/−8 | +15/−8 |
| +9 | +7/−9 | +8/−9 | +9/−9 | +10/−9 | +11/−9 | +12/−9 | +13/−9 | +14/−9 | +15/−9 |
| +10 | +7/−10 | +8/−10 | +9/−10 | +10/−10 | +11/−10 | +12/−10 | +13/−10 | +14/−10 | +15/−10 |
| +11 | +7/−11 | +8/−11 | +9/−11 | +10/−11 | +11/−11 | +12/−11 | +13/−11 | +14/−11 | +15/−11 |
| +12 | +7/−12 | +8/−12 | +9/−12 | +10/−12 | +11/−12 | +12/−12 | +13/−12 | +14/−12 | +15/−12 |
| +13 | +7/−13 | +8/−13 | +9/−13 | +10/−13 | +11/−13 | +12/−13 | +13/−13 | +14/−13 | +15/−13 |
| +14 | +7/−14 | +8/−14 | +9/−14 | +10/−14 | +11/−14 | +12/−14 | +13/−14 | +14/−14 | +15/−14 |
| +15 | +7/−15 | +8/−15 | +9/−15 | +10/−15 | +11/−15 | +12/−15 | +13/−15 | +14/−15 | +15/−15 |
| +16 thru +227 | 1a | 1a | 1a | 1a | 1a | 1a | 1a | 1a | 1a |

To understand the generation and execution of appropriate shift commands it is helpful to consider the following example. Let $x_G$ be the global scale of a vector x accessed from RAM 60 through scaling circuit 61 onto bus 31. Also, let $y_G$ be the global scale of a vector y at the input to scaling circuit 70. In the case of x, assume a local scale $x_L$ which accounts for the maximum upshift of 8 bits minus the 1 bit of truncation that occurs in the transfer to bus 31. The range of $x_L$ is then −8 to +7, in view of remarks made previously. As far as y is concerned only a 0 to 15 bit downshift is implemented. The incremental or relative scale shift Δ in this case is defined by $$\Delta = y_G - x_G \quad (1-1)$$

Clearly, for Δ to lead to feasible shift commands to scaling circuits 61 and 70, it must fall within the range $-(8+x_L)$ to 15. In terms of an inequality, a feasible Δ satisfies $$-(8+x_L) \leq \Delta \leq 15 \quad (1-2)$$

From (1-2), it is easy to derive appropriate FLAGs for terminating the vector updating and, consequently, the BCR process. Considering that $x_L$ has a maximum value of 7, is is easy to see that two simple FLAGs become

| FLAG #1 : Δ > 15 | (1-3) |
| FLAG #2 : Δ < − 15 | |

In view of (1-2), a refinement of FLAG#2 leads to the so-defined $$FLAG\#1a: \Delta < -(8+x_L) \quad (1-4)$$

Figure 5A:
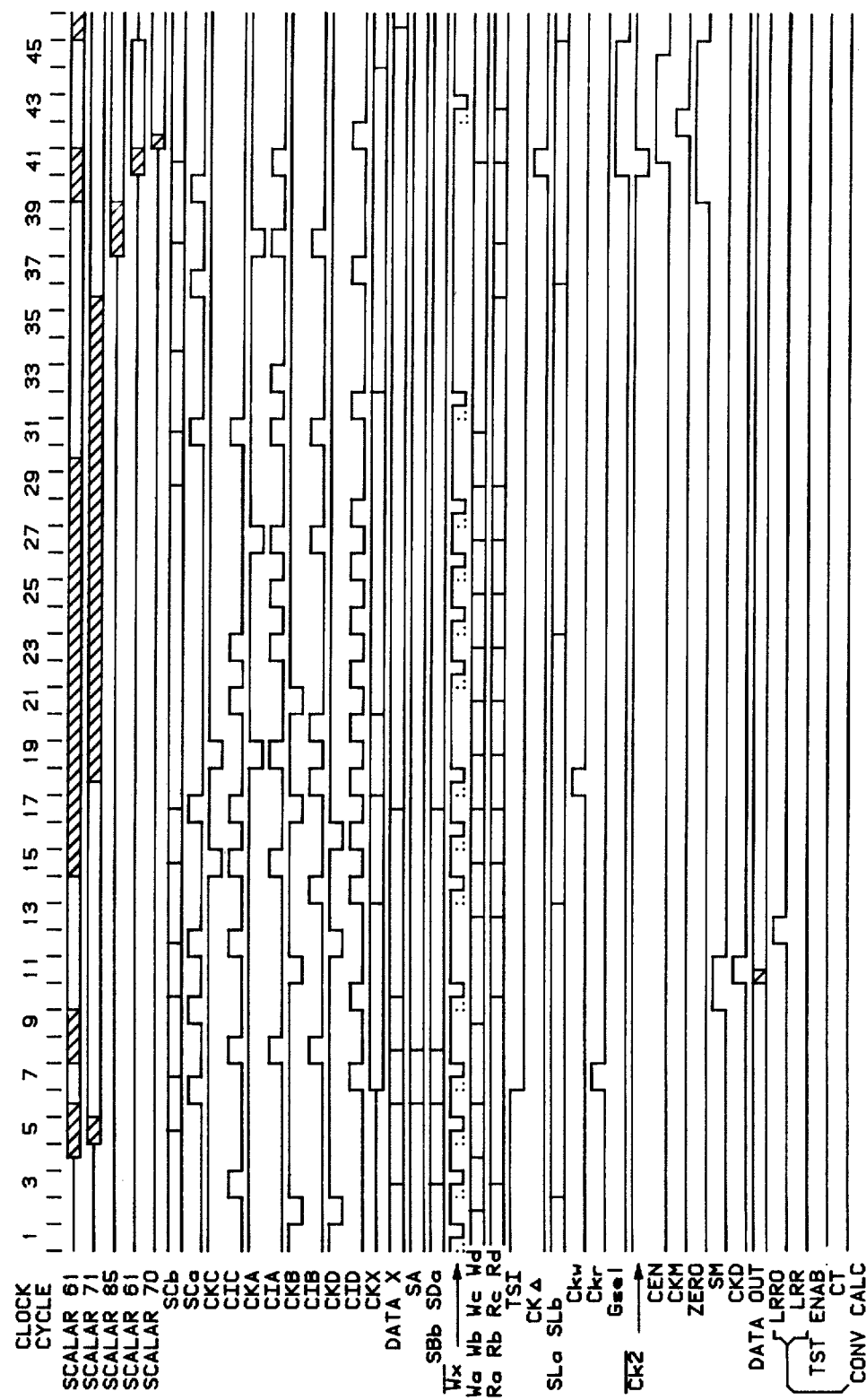

FIG. 5 illustrates a typical timing diagram for the global scaling unit described. The various signals shown are described in Table 9 and the application of each signal is illustrated in the block diagram of FIG. 4. It will of course be understood that both the timing diagram and the block diagram are illustrated for example and many changes may be devised by those skilled in the art.

TABLE 9

| SIGNAL | GSU Timing Signals DESCRIPTION |
|---|---|
| CKA | Clock for Summing Latch A |
| CIA | Clear for Summing Latch A |
| CKB | Clock for Summing Latch B |
| CIB | Clear for Summing Latch B |
| CKC | Clock for Summing Latch C |
| CIC | Clear for Summing Latch C |
| CKD | Clock for Summing Latch D |
| CID | Clear for Summing Latch D |
| CKX | Clock for Final Sum Latch X |
| CKΔ | Clock for Difference Latch Δ |
| CKO | Clock for Output Port Latch |
| CKM | Clock for Memory Latch |
| SA | 2:1 Select Control for Latch A |
| SB$_b$(MSB) SB$_a$(LSB) | 4:1 Select Control for Latch B |
| SC$_b$(MSB) SC$_a$(LSB) | 4:1 Select Control, Select Local Scale Output for Latch C |
| SD$_b$(MSB) SD$_a$(MSB) | 4:1 Select Control for Latch D |
| SM | 2:1 Select Control for Output Port Latch |
| SL$_b$(MSB) | 4:1 Select Control of Proper Local Scale Value ($s_L$) for Global Scaling Table |
| TSI | Tristate Input Port Enabling the Loading of Initial Scale Values for r and p Vectors Into Memory |
| CEN | Compare Enable fdor Loading Smaller of Two Global Scales into the GSU RAM, as Determined by the Sign of Δ |
| CKR | Clock to Latch Local Scale $r_L$ into Local Scale Storage |
| CKW | Clock to Latch Local Scale $w_L$ into Local Scale Storage |
| Test Enable | Test Local Scale $r_L^2$ Logic "1" Results if SHift is Maximum of 15. |
| Zero | Sets Δ = 0 for Calculation of w During First Iteration |

TABLE 9-continued

| SIGNAL | GSU Timing Signals DESCRIPTION |
|---|---|
| 1st I | Indicates First Iteration (Active Low) |
| $w_a$ | MSB |
| $w_b$ | ⎫ Scale Memory Write Address |
| $w_c$ | ⎬ |
| $w_d$ | LSB |
| $w_x$ | Write Clock for Scale Memory  |
| $R_a$ | MSB |
| $R_b$ | ⎫ Scale Memory Read Address |
| $R_c$ | ⎬ |
| $R_d$ | LSB |
| GSel | Global Scaling Control for Scaler 1 |
| CK2 | Clock for Scaler 2 Control Latch ($\overline{CK\Delta}$) |

A complete list of IC's used to implement the unit 90 is given in Table 10. The majority of the parts are Schottky 545/745 TTL characterized by low propagation delay that is required by the sensitive summing loop.

TABLE 10

| ITEM | Typical Components for Unit 90 DESIGNATED BLOCKS OF FIGS. 4 and 5 |
|---|---|
| 8 4 × 4 RAMs (74LS670) | RAM 117 |
| 3 Octal D FF (74S374) | Latches X, 131 and 142 |
| 4 2:1 Select (74S157) | Selector 121 and 140 |
| 7 4-Bit Adder (74S283) | Combining devices 110, 112, 114 and circuit 130 |
| 13 4:1 Select (74S153) | Selectors 123, 125, 127 and 160 |
| 12 Quad D FF (74S175) | Latch A, B, C, D, Δ, 153 and 155 |
| 2 3:8 Decode (74S138) | RAM 117 |
| 1 Octal Buffer (74LS244) | Buffer 135 |
| 1 Quad AND (74S08) | circuits 130, 150 |
| 2 Hex Inverter (74S04) | Circuit 137, Latcvhes A, B, C, D, and Δ |
| 1 Triple NOR (74LS27) | Circuits 130, 137 and 150 |
| 1 Quad OR (74S32) | Circuit 137 |
| 4 512 × 4 PROMS (HMI-7621) | Circuits 163 and 165 |

Table 11 summarizes the complete global scaling activity for a specific numerical example from initialization through four complete iterations. Specific numerical values are included immediately below each summing loop equation.

TABLE 11

| Strobe Number | Unit 90 Activity for a Typical Operation | | | | | | | |
|---|---|---|---|---|---|---|---|---|
| | X | = | A | + | B | + | C | − D |
| | | | Initialization | | | | | |
| | | | $r_g = p_g = w_g = 0$ | | | | | |
| 7 | $r_G$ | = | $r_g$ | + | 0 | + | $r_L$ | − 0 |
| | 0 | = | 0 | + | 0 | + | (1-1) | − 0 |
| 10 | $r_G^2$ | = | $r_G$ | + | $r_G$ | + | $r_L^2$ | − M |
| | −16 | = | 0 | + | 0 | + | (3-3) | − 16 |

TABLE 11-continued

Unit 90 Activity for a Typical Operation

| Strobe Number | X | = | A | + | B | + | C | − | D |
|---|---|---|---|---|---|---|---|---|---|
| | | | Main Loop - 1st Iteration | | | | | | |
| 14(1) | $p_G$ | = | $p_g$ | + | 0 | + | $p_L$ | − | 0 |
| | 0 | = | 0 | + | 0 | + | (1-1) | − | 0 |
| 16(2) | $X_1$ | = | $r_G^2$ | + | D | + | 0 | − | $M_0$ |
| | −2 | = | −16 | + | 29 | + | 0 | − | 15 |
| 18(3) | $w_G$ | = | $w_g$ | + | 0 | + | $w_L$ | − | 0 |
| | 7 | = | 0 | + | 0 | + | (8-1) | − | 0 |
| | | | Invalid at 1st iteration. | | | | | | |
| 20(4) | $1/r_G^2$ | = | 0 | + | D | + | 0 | − | $r_g^2$ |
| | 45 | = | 0 | + | 29 | + | 0 | − | (−16) |
| 22(5) | $Y_1$ | = | $1/r_G^2$ | + | 0 | + | 0 | − | $M_0$ |
| | 30 | = | 45 | + | 0 | + | 0 | − | 15 |
| 24(6) | $Y_{12}$ | = | $p_G$ | + | $X_1$ | + | 0 | − | $M_0$ |
| | 15 | = | 0 | + | 30 | + | 0 | − | 15 |
| 26(7) | $X_{12}$ | = | $p_G$ | + | $X_1$ | + | 0 | − | $M_0$ |
| | −17 | = | 0 | + | (−2) | + | 0 | − | 15 |
| 28(8) | $X_{123}$ | = | 0 | + | $X_{12}$ | + | 0 | − | $w_G$ |
| | −24 | = | 0 | + | (−17) | + | 0 | − | 7 |
| 32(9) | $Cp_G$ | = | $p_G$ | + | (−2) | + | $Cp_L$ | − | M |
| | −14 | = | 0 | + | (−2) | + | (5-1) | − | 16 |
| 37(10) | $pCp_G$ | = | $p_G$ | + | $Cp_G$ | + | $pCp_L$ | − | M |
| | −29 | = | 0 | + | (−14) | + | (4-3) | − | 16 |
| (11) | $\Delta w$ | = | 0 | + | $X_{123}$ | + | $\alpha_L$ | − | $pCp_G$ |
| | 6 | = | 0 | + | (−24) | + | 1 | − | (−29) |
| | | | Set $\Delta w = 0$ at 1st iteration | | | | | | |
| 42(12) | $\alpha p_G$ | = | 0 | + | $X_{12}$ | + | $\alpha_L$ | − | $pCp_G$ |
| | 13 | = | 0 | + | (−17) | + | 1 | − | (029) |
| (13) | $w_g = \min (\alpha p_G, w_G)$ | | | | | | | | |
| | $7 = \min (13,7)$ | | | | | | | | |
| | | | Set $w_g = (\alpha p_G)$ at 1st iteration | | | | | | |
| 47(14) | $\alpha_G$ | = | 0 | + | $X_1$ | + | $\alpha_L$ | − | $pCp_G$ |
| | 28 | = | 0 | + | (−2) | + | 1 | − | (−29) |
| 49(15) | $\alpha Cp_G$ | = | 0 | + | $X_1$ | + | $\alpha_L$ | − | $pCp_G$ |
| | −1 | = | 0 | + | (−14) | + | 0 | − | 15 |
| (16) | $\Delta_r$ | = | $\alpha Cp_G$ | + | 0 | + | 0 | − | $r_G$ |
| | −1 | = | −1 | + | 0 | + | 0 | − | 0 |
| (17) | $r_g = \min (\alpha Cp_G, r_G)$ | | | | | | | | |
| | $-1 = \min (-1,0)$ | | | | | | | | |
| | | | Since $\Delta r < 0$, Load $\alpha Cp_G$ into $r_g$ | | | | | | |
| 58(18) | $r_G$ | = | $r_g$ | + | 0 | + | $r_L$ | − | 0 |
| | 1 | = | −1 | + | 0 | + | (3-1) | − | 0 |
| 60(19) | $Y_{123}$ | = | $Y_{12}$ | + | 0 | + | 0 | − | $r_G$ |
| | 14 | = | 15 | + | 0 | + | 0 | − | 1 |
| 64(20) | $r_G^2$ | = | $r_G$ | + | $r_G$ | + | $r_L^2$ | − | M |
| | −14 | = | 1 | + | 1 | + | (3-3) | − | 16 |
| (21) | $\Delta p$ | = | $Y_{123}$ | + | $r_G^2$ | + | $\beta_L$ | − | 0 |
| | 0 | = | 14 | + | (−14) | + | 0 | − | 0 |
| 69(22) | $\beta p_G$ | = | $Y_{12}$ | + | $r_G^2$ | + | $\beta_L$ | − | 0 |
| | 1 | = | 15 | + | −14 | + | 0 | − | 0 |
| (23) | $p_g = \min (\beta p_G, r_G)$ | | | | | | | | |
| | $1 = \min (1,1)$ | | | | | | | | |
| | | | Since $\Delta p \geq 0$, Load $r_G$ into $p_g$ | | | | | | |
| 72(24) | $\beta_G$ | = | $Y_1$ | + | $r_G^2$ | + | $\beta_L$ | − | 0 |
| | 16 | = | 30 | + | (−14) | + | 0 | − | 0 |
| | $\Delta r_{G1}^2$ | = | $r_{G1}^2$ | − | $r_{G0}^2$ | | | | |
| | 2 | = | −14 | − | (−16) | | | | |
| | | | Main Loop - 2nd Iteration | | | | | | |
| 80(1) | $p_G$ | = | $p_g$ | + | 0 | + | $p_L$ | − | 0 |
| | 0 | = | 1 | + | 0 | + | (0-1) | − | 0 |
| 82(2) | $X_1$ | = | $r_G^2$ | + | D | + | 0 | − | $M_0$ |
| | 0 | = | −14 | + | 29 | + | 0 | − | 15 |
| 84(3) | $w_G$ | = | $w_g$ | + | 0 | + | $w_L$ | − | 0 |
| | 14 | = | 13 | + | 0 | + | (2-1) | − | 0 |
| 86(4) | $1/r_G^2$ | = | 0 | + | D | + | 0 | − | $r_G^2$ |
| | 43 | = | 0 | + | 29 | + | 0 | − | (−14) |
| 88(5) | $Y_1$ | = | $1/r_G^2$ | + | 0 | + | 0 | − | $M_0$ |
| | 28 | = | 43 | + | 0 | + | 0 | − | 15 |
| 90(6) | $Y_{12}$ | = | $p_G$ | + | $Y_1$ | + | 0 | − | $M_0$ |
| | 13 | = | 0 | + | 28 | + | 0 | − | 15 |
| 92(7) | $X_{12}$ | = | $p_G$ | + | $X_1$ | + | 0 | − | $M_0$ |
| | −15 | = | 0 | + | 0 | + | 0 | − | 15 |
| 94(8) | $X_{123}$ | = | 0 | + | $X_{12}$ | + | 0 | − | $w_G$ |
| | −29 | = | 0 | + | (−15) | + | 0 | − | 14 |
| 98(9) | $Cp_G$ | = | $p_G$ | + | (−2) | + | $Cp_L$ | − | M |
| | −14 | = | 0 | + | (−2) | + | (5-1) | − | 16 |
| 103(10) | $pCp_G$ | = | $p_G$ | + | $Cp_G$ | + | $pCp_L$ | − | M |
| | −28 | = | 0 | + | (−14) | + | (5-3) | − | 16 |
| (11) | $\Delta w$ | = | 0 | + | $X_{123}$ | + | $\alpha_L$ | − | $pCp_G$ |
| | 0 | = | 0 | + | (−29) | + | 1 | − | (−28) |
| 108(12) | $\alpha p_G$ | = | 0 | + | $X_{12}$ | + | $\alpha_L$ | − | $pCp_G$ |
| | 14 | = | 0 | + | (−15) | + | 1 | − | (−28) |
| (13) | $w_g = \min (p_G, w_G)$ | | | | | | | | |
| | $14 = \min (14,14)$ | | | | | | | | |
| | | | Since $\Delta w \geq 0$, load $w_G$ into $w_g$ | | | | | | |
| 113(14) | $\alpha_G$ | = | 0 | + | $X_1$ | + | $\alpha_L$ | − | $pCp_G$ |
| | 29 | = | 0 | + | 0 | + | 1 | − | (−28) |
| (15) | $\alpha Cp_G$ | = | $\alpha_G$ | + | $Cp_G$ | + | 0 | − | $M_0$ |
| | 0 | = | 29 | + | (−14) | + | 0 | − | 15 |
| (16) | $\Delta r$ | = | $Cp_G$ | + | 0 | + | 0 | − | $r_G$ |
| | −1 | = | 0 | + | 0 | + | 0 | − | 1 |
| (17) | $r_g = \min (\alpha Cp_G, r_G)$ | | | | | | | | |
| | $0 = \min (0,1)$ | | | | | | | | |
| | | | Since $\Delta p < 0$, load $\alpha Cp_G$ into $r_g$ | | | | | | |
| 124(18) | $r_G$ | = | $r_g$ | + | 0 | + | $r_L$ | − | 0 |
| | 1 | = | 0 | + | 0 | + | (2-1) | − | 0 |
| 126(19) | $Y_{123}$ | = | $Y_{12}$ | + | 0 | + | 0 | − | $r_G$ |
| | 12 | = | 13 | + | 0 | + | 0 | − | 1 |
| 130(20) | $r_G^2$ | = | $r_G$ | + | $r_G$ | + | $r_L^2$ | − | M |
| | −13 | = | 1 | + | 1 | + | (4-3) | − | 16 |
| (21) | $\Delta p$ | = | $Y_{123}$ | + | $r_G^2$ | + | $\beta_L$ | − | 0 |
| | −1 | = | 12 | + | (−13) | + | 0 | − | 0 |
| 135(22) | $\beta p_G$ | = | $Y_{12}$ | + | $r_G^2$ | + | $\beta_L$ | − | 0 |
| | 0 | = | 13 | + | (−13) | + | 0 | − | 0 |
| (23) | $p_g = \min (\beta p_G, r_G)$ | | | | | | | | |
| | $0 = \min (0,1)$ | | | | | | | | |
| | | | Since $\Delta p < 0$, load $\beta p_G$ into $p_g$ | | | | | | |
| 138(24) | $\beta_G$ | = | $Y_1$ | + | $r_G^2$ | + | $\beta_L$ | − | 0 |
| | 15 | = | 28 | + | (−13) | + | 0 | − | 0 |
| | $\Delta r_{G2}^2$ | = | $r_{G2}^2$ | − | $r_{G0}^2$ | | | | |
| | 3 | = | −13 | − | (−16) | | | | |
| | | | Main Loop - 3rd Iteration | | | | | | |
| 146(1) | $p_G$ | = | $p_g$ | + | 0 | + | $p_L$ | − | 0 |
| | 1 | = | 0 | + | 0 | + | (2-1) | − | 0 |
| 148(2) | $X_1$ | = | $r_G^2$ | + | D | + | 0 | − | $M_0$ |
| | 1 | = | −13 | + | 29 | + | 0 | − | 15 |
| 150(3) | $w_G$ | = | $w_g$ | + | 0 | + | $w_L$ | − | 0 |
| | 14 | = | 14 | + | 0 | + | (1-1) | − | 0 |
| 152(4) | $1/r_G^2$ | = | 0 | + | D | + | 0 | − | $r_G^2$ |
| | 42 | = | 0 | + | 29 | + | 0 | − | (−13) |
| 154(5) | $Y_1$ | = | $1/r_G^2$ | + | 0 | + | 0 | − | $M_0$ |
| | 27 | = | 42 | + | 0 | + | 0 | − | 15 |
| 156(6) | $Y_{12}$ | = | $p_G$ | + | $Y_1$ | + | 0 | − | $M_0$ |
| | 13 | = | 1 | + | 27 | + | 0 | − | 15 |
| 158(7) | $X_{12}$ | = | $p_G$ | + | $X_1$ | + | 0 | − | $M_0$ |
| | −13 | = | 1 | + | 1 | + | 0 | − | 15 |
| 160(8) | $X_{123}$ | = | 0 | + | $X_{12}$ | + | 0 | − | $w_G$ |
| | −27 | = | 0 | + | (−13) | + | 0 | − | 14 |
| 164(9) | $Cp_G$ | = | $p_G$ | + | (−2) | + | $Cp_L$ | − | M |
| | −11 | = | 1 | + | (−2) | + | (7-1) | − | 16 |
| 169(10) | $pCp_G$ | = | $p_G$ | + | $Cp_G$ | + | $pCp_L$ | − | M |
| | −25 | = | 1 | + | (−11) | + | (4-3) | − | 16 |
| (11) | $\Delta w$ | = | 0 | + | $X_{123}$ | + | $\alpha_L$ | − | $pCp_G$ |
| | −2 | = | 0 | + | (−27) | + | 0 | − | (−25) |
| 174(12) | $\alpha p_G$ | = | 0 | + | $X_{12}$ | + | $\alpha_L$ | − | $pCp_G$ |
| | 12 | = | 0 | + | (−13) | + | 0 | − | (−25) |
| (13) | $w_g = \min (\alpha p_G, w_G)$ | | | | | | | | |
| | $12 = \min (12,14)$ | | | | | | | | |
| | | | Since $\Delta w < 0$, load $\alpha p_G$ into $w_g$ | | | | | | |
| 179(14) | $\alpha_G$ | = | 0 | + | $X_1$ | + | $\alpha_L$ | − | $pCp_G$ |
| | 26 | = | 0 | + | 1 | + | 0 | − | (−25) |
| 181(15) | $\alpha Cp_G$ | = | $\alpha_G$ | + | $Cp_G$ | + | 0 | − | $M_0$ |
| | 0 | = | 26 | + | (−11) | + | 0 | − | 15 |

TABLE 11-continued
Unit 90 Activity for a Typical Operation

| Strobe Number | X | = | A | + | B | + | C | − | D |
|---|---|---|---|---|---|---|---|---|---|
| (16) | $\Delta r$ | = | $\alpha Cp_G$ | + | 0 | + | 0 | − | $r_G$ |
|  | −1 | = | 0 | + | 0 | + | 0 | − | 1 |
| (17) | $r_g = \min(\alpha Cp_G, r_G)$ | | | | | | | | |
|  | $0 = \min(0,1)$ | | | | | | | | |

*Since $\Delta r < 0$, load $\alpha Cp_G$ into $r_g$*

| 190(18) | $r_G$ | = | $r_g$ | + | 0 | + | $r_L$ | − | 0 |
|---|---|---|---|---|---|---|---|---|---|
|  | 1 | = | 0 | + | 0 | + | (2-1) | − | 0 |
| 192(19) | $Y_{123}$ | = | $Y_{12}$ | + | 0 | + | 0 | − | $r_G$ |
|  | 12 | = | 13 | + | 0 | + | 0 | − | 1 |
| 196(20) | $r_G^2$ | = | $r_G$ | + | $r_G$ | + | $r_L^2$ | − | M |
|  | −13 | = | 1 | + | 1 | + | (4-3) | − | 16 |
| (21) | $\Delta p$ | = | $Y_{123}$ | + | $r_G^2$ | + | $\beta_L$ | − | 0 |
|  | 0 | = | 12 | + | (−13) | + | 1 | − | 0 |
| 201(22) | $\beta p_G$ | = | $Y_{12}$ | + | $r_G^2$ | + | $\beta_L$ | − | 0 |
|  | 1 | = | 13 | + | (−13) | + | 1 | − | 0 |
| (23) | $p_g = \min(\beta p_G, r_G)$ | | | | | | | | |
|  | $1 = \min(+1, +1)$ | | | | | | | | |

*Since $\Delta p \geq 0$, load $r_G$ into $p_g$*

| 204(24) | $\beta_G$ | = | $Y_1$ | + | $r_G^2$ | + | $\beta_L$ | − | 0 |
|---|---|---|---|---|---|---|---|---|---|
|  | 15 | = | 27 | + | (−13) | + | 1 | − | 0 |
|  | $\Delta r_{G3}^2$ | = | $r_{G3}^2$ | − | $r_{G0}^2$ | | | | |
|  | 3 | = | −13 | − | (−16) | | | | |

Main Loop - 4th Iteration

| 212(1) | $p_G$ | = | $p_g$ | + | 0 | + | $p_L$ | − | 0 |
|---|---|---|---|---|---|---|---|---|---|
|  | 1 | = | 1 | + | 0 | + | (1-1) | − | 0 |
| 214(2) | $X_1$ | = | $r_G^2$ | + | D | + | 0 | − | $M_0$ |
|  | 1 | = | −13 | + | 29 | + | 0 | − | 15 |
| 216(3) | $w_G$ | = | $w_g$ | + | 0 | + | $w_L$ | − | 0 |
|  | 12 | = | 12 | + | 0 | + | (1-1) | − | 0 |
| 218(4) | $1/r_G^2$ | = | 0 | + | D | + | 0 | − | $r_G^2$ |
|  | 42 | = | 0 | + | 29 | + | 0 | − | (−13) |
| 220(5) | $Y_1$ | = | $1/r_G^2$ | + | 0 | + | 0 | − | $M_0$ |
|  | 27 | = | 42 | + | 0 | + | 0 | − | 15 |
| 222(6) | $Y_{12}$ | = | $p_G$ | + | $Y_1$ | + | 0 | − | $M_0$ |
|  | 13 | = | 1 | + | 27 | + | 0 | − | 15 |
| 224(7) | $X_{12}$ | = | $p_G$ | + | $X_1$ | + | 0 | − | $M_0$ |
|  | −13 | = | 1 | + | 1 | + | 0 | − | 15 |
| 226(8) | $X_{123}$ | = | 0 | + | $X_{12}$ | + | 0 | − | $w_G$ |
|  | −25 | = | 0 | + | (−13) | + | 0 | − | 12 |
| 230(9) | $Cp_G$ | = | $p_G$ | + | (−2) | + | $Cp_L$ | − | M |
|  | −10 | = | 1 | + | (−2) | + | (8-1) | − | 16 |
| 235(10) | $pCp_G$ | = | $p_G$ | + | $Cp_G$ | + | $pCp_L$ | − | M |
|  | −25 | = | 1 | + | −10 | + | (3-3) | − | 16 |
| (11) | $\Delta w$ | = | 0 | + | $X_{123}$ | + | $\alpha_L$ | − | $pCp_G$ |
|  | 0 | = | 0 | + | (−25) | + | 0 | − | (−25) |
| 240(12) | $\alpha p_G$ | = | 0 | + | $X_{12}$ | + | $\alpha_L$ | − | $pCp_G$ |
|  | 12 | = | 0 | + | (−13) | + | 0 | − | (−25) |
| (13) | $w_g = \min(\alpha p_G, w_G)$ | | | | | | | | |
|  | $12 = \min(12,12)$ | | | | | | | | |

*Since $\Delta w \geq 0$, load $w_G$ in $w_g$*

| 245(14) | $\alpha_G$ | = | 0 | + | $X_1$ | + | $\alpha_L$ | − | $pCp_G$ |
|---|---|---|---|---|---|---|---|---|---|
|  | 26 | = | 0 | + | 1 | + | 0 | − | (−25) |
| 247(15) | $\alpha Cp_G$ | = | $\alpha_G$ | + | $Cp_G$ | + | 0 | − | $M_0$ |
|  | 1 | = | 16 | + | (−10) | + | 0 | − | 15 |
| (16) | $\Delta r$ | = | $\alpha Cp_G$ | + | 0 | + | 0 | − | $r_G$ |
|  | 0 | = | 1 | + | 0 | + | 0 | − | 1 |
| (17) | $r_g = \min(\alpha Cp_G, r_G)$ | | | | | | | | |
|  | $1 = \min(1,1)$ | | | | | | | | |

*Since $\Delta r \geq 0$, load $r_G$ into $r_g$*

| 256(18) | $r_G$ | = | $r_g$ | + | 0 | + | $r_L$ | − | 0 |
|---|---|---|---|---|---|---|---|---|---|
|  | 8 | = | 1 | + | 0 | + | (8-1) | − | 0 |
| 258(19) | $Y_{123}$ | = | $Y_{12}$ | + | 0 | + | 0 | − | $r_G$ |
|  | 5 | = | 13 | + | 0 | + | 0 | − | 8 |
| 262(20) | $r_G^2$ | = | $r_G$ | + | $r_G$ | + | $r_L^2$ | − | M |
|  | 2 | = | 8 | + | 8 | + | (5-3) | − | 16 |
|  | $\Delta r_{G4}^2$ | = | $r_{G4}^2$ | − | $r_{G0}^2$ | | | | |
|  | 18 | = | 2 | − | (−16) | | | | |

Stopping Condition $\Delta r_G^2 > 15$ has been satisfied

While we have shown and described a specific embodiment of this invention, further modifications and improvements will occur to those skilled in the art. We desire it to be understood, therefore, that this invention is not limited to the particular form shown and we intend in the appended claims to cover all modifications which do not depart from the spirit and scope of this invention.

We claim:

1. An adaptive fixed point arithmetic controller for use with a digital processor having bit-shifting circuitry therein comprising:

(a) storage and combining means having a plurality of inputs for receiving a plurality of digital signals thereon representative of bit-shifts accomplished in a plurality of mathematical operations in the processor, said storage and combining means providing an output signal representative of the total number of bit-shifts present subsequent to the completion of the plurality of mathematical operations, and (b) control means connected to said storage and combining means for receiving signals representative of the bit-shifts associated with digital signals at predetermined ones of the mathematical operations and providing control signals to selected portions of the bit-shifting circuitry for controlling the portions to shift the digital signals so that the predetermined ones of the mathematical operations can be performed.

2. An adaptive fixed point arithmetic controller as claimed in claim 1 wherein the storage and combining means includes a plurality of clocked latches and adding circuits connected into a loop.

3. An adaptive fixed point arithmetic controller as claimed in claim 2 wherein the loop further includes clocked multi-input selecting circuits for introducing the plurality of digital signals into the loop at predetermined times.

4. An adaptive fixed point arithmetic controller as claimed in claim 3 wherein the loop further includes memory means for storing predetermined intermediate calculations of the total number of bit shifts.

5. An adaptive fixed point arithmetic controller as claimed in claim 1 including, in addition, special circuitry for generating and supplying a stopping signal to the processor upon the occurrence of predetermined bit-shifts.

6. An adaptive fixed point arithmetic controller for use with a digital processor having bit-shifting circuitry therein comprising:

(a) clocked selecting means having a plurality of inputs and outputs, said selecting means operating in response to the application of clock signals thereto to connect predetermined inputs to the outputs;

(b) first clocked latch means having a plurality of inputs connected to the outputs of said selecting means and a plurality of outputs;

(c) summing means connected to the outputs of said first latch means for combining signals at the latch means outputs in a predetermined relationship;

(d) second clocked latch means connected to receive the combined signals from said summing means and apply the combined signals to predetermined ones of the plurality of inputs to said selecting means; and (e) output means connected to said second latch means.

7. An adaptive fixed point arithmetic controller as claimed in claim 6 including stopping circuitry connected to the summing means for generating a stopping signal upon the occurrence of predetermined bit-shifts.

8. An adaptive fixed point arithmetic controller as claimed in claim 6 including, in addition, memory means connected to the second clocked latch for storing predetermined intermediate calculations and means for connecting the memory means to predetermined ones of the plurality of inputs to the selecting means.

9. An adaptive fixed point arithmetic controller as claimed in claim 8 wherein the clocked selecting means includes four selectors and the first clocked latch means includes four latches each associated with one of said selectors, each of said four selectors having a plurality of inputs, three of the associated selectors each having inputs connected to receive the combined signal from the second latch means, with two of the three associated selectors also having inputs connected to receive the stored intermediate calculations from the memory means and inputs connected to receive predetermined bias signals, and the fourth of the associated selectors having inputs connected to receive bit shifting signals from the bit shifting circuitry in the digital processor.

10. An adaptive fixed point arithmetic controller as claimed in claim 9 wherein three of the four latches of the first clocked latch means are designated A, B and D and the fourth latch is designated means C, and the summing means combines signals thereon in accordance with the relationship $$A + B + C - D.$$

* * * * *